(12) United States Patent
Hatta

(10) Patent No.: US 6,618,450 B1
(45) Date of Patent: Sep. 9, 2003

(54) RECEIVING APPARATUS AND RECEIVING METHOD

(75) Inventor: Koichi Hatta, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/272,402

(22) Filed: Mar. 19, 1999

(30) Foreign Application Priority Data

Nov. 24, 1998 (JP) .......................................... 10-332203

(51) Int. Cl.[7] ................................................ H04L 27/06
(52) U.S. Cl. ...................................................... 375/340
(58) Field of Search ................................. 375/340, 354, 375/341, 262; 714/775, 789, 794, 795, 798, 707, 758, 762, 768

(56) References Cited

U.S. PATENT DOCUMENTS 6,078,625 A * 6/2000 McCallister et al. ........ 375/261
6,185,717 B1 * 2/2001 Fukunaga et al. .......... 714/777
6,226,768 B1 * 5/2001 Chujo et al. ................ 714/746
6,249,895 B1 * 6/2001 Kikuchi et al. ............. 714/775

* cited by examiner

Primary Examiner—Chi Pham
Assistant Examiner—Emmanuel Bayard
(74) Attorney, Agent, or Firm—Staas & Halsey LLP

(57) ABSTRACT

With a first-transition detecting circuit for receiving a synchronism detection signal indicating the state where synchronism of a digital signal has been established and outputting a pulse, a flip-flop for receiving this pulse and outputting a flag signal of "H" level, and logic gates, when a TMCC decoding complete signal indicating completion of a TMC signal is generated the TMCC signal inputted into a buffer anew is written in a register, and this TMCC signal is used for decoding a data stream. Then, in the state where synchronism of a digital signal has been established, updating of a TMCC signal is executed in response to output of a signal from a comparing circuit indicating inconsistency between updating instruction information newly inputted and updating instruction information already stored.

15 Claims, 13 Drawing Sheets

GENERAL CONFIGURATION OF A TMCC OBTAINING CIRCUIT IN A RECEIVING APPARATUS ACCORDING TO EMBODIMENT 1

BLOCK DIAGRAM SHOWING GENERAL CONFIGURATION OF AN INTERNAL CODING ERROR CONTROL SIGNAL ADDING CIRCUIT IN A TRANSMITTER BASED ON THE CONVENTIONAL TECHNOLOGY

FIG. 3
EXPLANATORY VIEW SHOWING A DIGITAL PHASE-MODULATING SYSTEM BASED ON THE CONVENTIONAL TECHNOLOGY
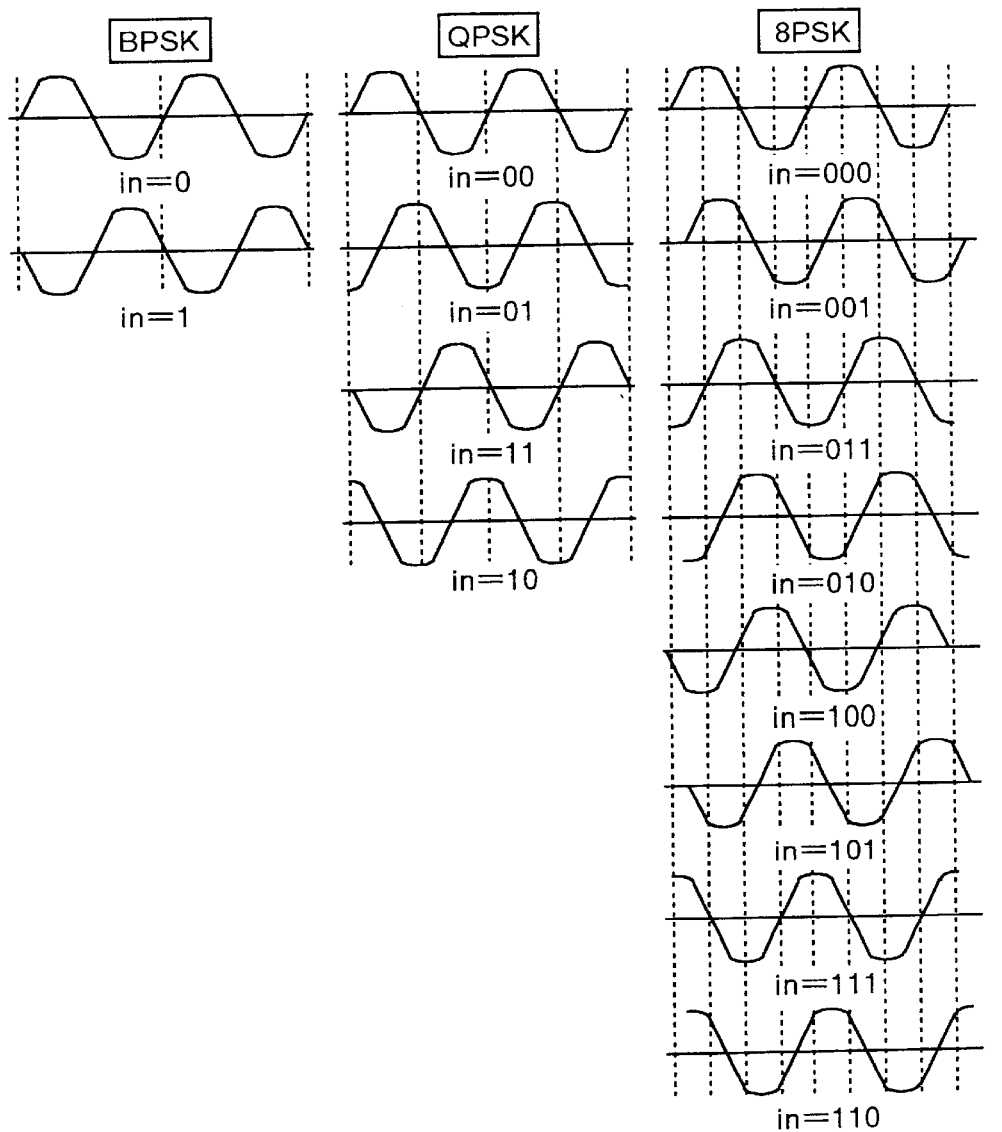
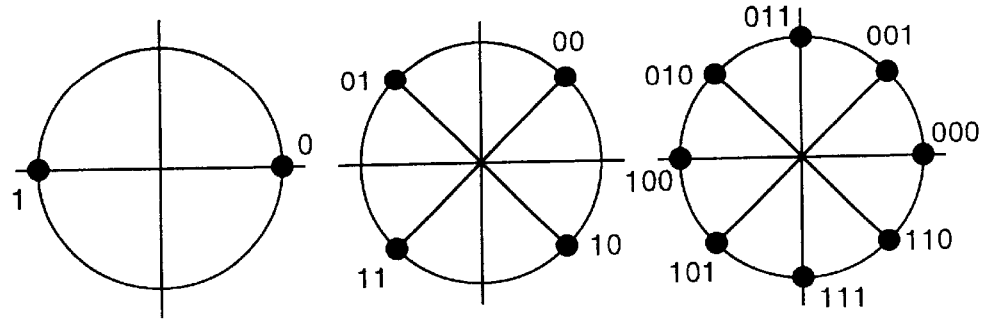

BLOCK DIAGRAM SHOWING GENERAL CONFIGURATION OF A RECEIVING APPARATUS BASED ON THE CONVENTIONAL TECHNOLOGY

BLOCK DIAGRAM SHOWING GENERAL CONFIGURATION OF A TMCC OBTAINING CIRCUIT IN A RECEIVING APPARATUS BASED ON THE CONVENTIONAL TECHNOLOGY

FIG.9 GENERAL CONFIGURATION OF A TMCC OBTAINING CIRCUIT IN A RECEIVING APPARATUS ACCORDING TO EMBODIMENT 1

TIME CHART SHOWING OPERATIONS OF A RECEIVING APPARATUS ACCORDING TO EMBODIMENT 1

BLOCK DIAGRAM SHOWING GENERAL CONFIGURATION OF A RECEIVING APPARATUS ACCORDING TO EMBODIMENT 2

BLOCK DIAGRAM SHOWING ANOTHER GENERAL CONFIGURATION OF
A RECEIVING APPARATUS ACCORDING TO EMBODIMENT 2

RECEIVING APPARATUS AND RECEIVING METHOD

FIELD OF THE INVENTION

The present invention relates to a receiving apparatus for and receiving method of receiving a digitally modulated digital signal, and more specifically to a receiving apparatus for and receiving method of receiving a digital signal in which real data and information indicating a transfer method therefor are multiplexed therein and decoding the real data step by step while decoding the transfer system.

BACKGROUND OF THE INVENTION

The history of development in the field of integrated circuits enabling high speed processing of digital data and a coding technology in recent years indicates a trend of shifting of technology from an analog system to that based on a digital system. Especially, the trend is remarkable in the field of telecommunications, and services such as television broadcasting or satellite broadcasting are now shifting to those based on the digital system.

In a case of the digital broadcasting, the digitizing processing is executed to a signal indicating service information, and the resultant digital data is transferred. Among them, in the digital satellite broadcasting a carrier wave is modulated using digital data indicating contents of information to be transferred (digital modulation), the resultant signal is transmitted via a satellite and is directly received by a receiver installed in each house.

In a case where a signal subjected to digital modulation is transferred by means of cable communication, sometimes the signal can not accurately be received due to a quality of the transfer path, a transfer distance, or noise environment around the transfer path. On the contrary in a case where a modulated signal is transferred through a radio system like in the television broadcasting, because electric waves are used as carrier waves a quality of a transfer space as a transfer path becomes lower due to the influence of the climate or the like and sometimes the receiving conditions become worst.

To execute the modulation/demodulation with high reproducibility in transmitting and receiving signals and to overcome the problems as described above, in the radio communication, whether it be an analog or a digital communication system it is necessary to divide the radio frequency band to narrower frequency bands in order to realize a plurality of communication paths and to use each band area as one communication path.

Like in a case of the digital satellite broadcasting as described above, when a digitally modulated signal is transmitted through radio communications, as higher reproducibility is required for each bit constituting the digital data, generally to provide redundancy in transmission, the digital data to be digitally modulated is encoded with redundancy added to the real data. In the following description, digital data obtained by means of encoding the real data is defined as a data stream.

When redundancy of the digital data is increased its error correction capability is improved. Namely, even if a data stream with high redundancy includes many error bits in receiving, the error bits can be corrected, and the data stream can correctly be reproduced in transmission. At the same time, the data stream with high redundancy as described above has redundancy data added to the real data and the amount of data increases so that the transmission efficiency becomes disadvantageously lower.

For instance, when information such as an image or voice is transferred as a data stream including a few errors, the information is acceptable even if the data stream is disturbed a little in receiving, so that the information may be transferred by lowering the redundancy to a relatively low level to raise the transfer efficiency. On the other hand, in a data stream expressing a computer program or the like in which it is not admissible to have an error of even one bit, accurate reproduction of the information is required in receiving by raising the redundancy to a relatively high level.

As described above, even in a case of digital data with redundancy added to the real data, it is recognized simply as a bit array in receiving, and the redundancy included in the data stream can not be extracted. Therefore, information indicating what type of redundancy is included in which section of a multiplexed data (data configuration control signal) is further added to the data stream in transmission.

This data configuration control signal is generally called as TMCC (Transmission & Multiplexing Configuration Control), and the term TMCC signal is used also in the following description.

In a receiving apparatus for receiving a digital signal in which a data stream and a TMCC signal are multiplexed, the TMCC signal must accurately be received without fail to recognize redundancy of the data stream according to information indicating the TMCC signal and also to execute decoding processing for extracting and correcting real data from the data stream. Redundancy given to this TMCC signal is set to a relatively high level and also the redundancy is previously obtained in the receiving apparatus which insures recognition of the TMCC signal.

FIG. 1 is a block diagram showing general configuration of a transmitter based on the conventional technology. FIG. 1 especially shows an example of a transmitter for digital satellite transmission. In FIG. 1, the transmitter comprises an outer coding error control signal adding circuit 101 for encoding input signals TS1, TS2, . . . (described as input signal TS hereinafter), a frame forming circuit 102, an energy dispersal circuit 103, an interleaver 104, an inner coding error control signal adding circuit 105, a TMCC signal generating circuit 106 for encoding a TMCC signal, an outer coding error control signal adding circuit 107, an energy dispersal circuit 108, an inner coding error control signal adding circuit 109 and a modulating circuit 110.

It should be noted that, in FIG. 1, the input signal TS as an example of digital data is a digital data stream (transport stream) compressed by MPEG2 (Motion Picture Expert Group 2) which is one of the motion picture compressing systems. In this case, multiplexing means that, when 8 types of input signals TS1 to TS8 each indicating different information contents (such as programs provided by broadcasting stations), a data stream comprising an array of these input signals TS1 to TS8 is transferred using one carrier wave.

At first, a TMCC signal as transfer information for the input signal TS is generated in the TMCC signal generating circuit 106. The transfer information for the input signal TS indicates a position (timing) of each of the input signals TS multiplexed on a carrier wave and the transfer system (including the redundancy or the like).

The input signal TS is first inputted to the outer coding error control signal adding circuit 101. The outer coding error control signal adding circuit 101 is a circuit for adding a redundancy signal (an outer coding error control signal) enabling correction of an error byte by byte in a receiving apparatus to each input signal TS and outputting the added signal (described as input signal TS' hereinafter). Namely, the outer coding error control signal adding circuit 101 is a circuit for adding redundancy to the input signal TS, and for instance the Reed Solomon encoding system is used for encoding the input signals TS.

The input signal TS' outputted from the outer coding error control signal adding circuit 101 is inputted into the frame forming circuit 102. The frame forming circuit 102 is a circuit for forming a frame as a multiplexed data unit by multiplexing each input signal TS' according to the transfer information indicated by a TMCC signal outputted from the TMCC signal generating circuit 106.

A signal outputted from the frame forming circuit in the units of frame is inputted into the energy dispersal circuit 103. The energy dispersal circuit 103 is a circuit for adding (scrambling) a pseudo random signal (an energy dispersal signal) to the digital data so that digital data constituting the input frame, namely the bit array will not be transferred as a long succession of bit "0" or bit "1".

This circuit is required for detection of abnormality in a digital signal or to prevent a failure in the detection of a digital signal when a long succession of the same bits is required in the receiving side. As the pseudo random signal described above is required to be removed in the receiving side, also in the energy dispersal circuit 103 at which position of digital data the information indicating conditions for generation of a pseudo random signal such as random initial value is located is decided by referring to the transfer information indicated by a TMCC signal outputted from the TMCC signal generating circuit 106.

The signal scrambled in the energy dispersal circuit 103 is inputted into the interleaver 104. The interleaver 104 is a circuit for rearranging digital data indicated by the inputted signal in the units of byte to improve a burst error (successive errors continued for a long time) appearing within an extremely short period of time.

With this circuit, even when a burst error occurs in the rearranged digital signal, the processing for reproducing the rearranged digital signals (processing by the deinterleaver described later) is executed, so that errors appearing within an extremely short period of time can be distributed, which makes it possible to raise the error correction capability or recognition rate of transferred information. Also the information for rearrangement described above can be obtained from transfer information indicated by the TMCC signal outputted from the TMCC signal generating circuit 106.

The signals rearranged by the interleaver 104 are inputted into the Inner coding error control signal adding circuit 105. The inner cording error control signal adding circuit 105 is a circuit for adding a redundancy signal (inner coding error control signal) enabling correction of a random error which is an irregular error by a bit unit such as heat or noises generated in a transfer path of a receiving apparatus to an inputted signal. Namely, the inner coding error controls. Namely the inner coding error control signal adding circuit 105 is a circuit for adding redundancy to an inputted signal, and for instance, convolutional code is used.

FIG. 2 is a block diagram showing general configuration of an internal circuit for adding convolutional code in the inner coding error control signal adding circuit 105. The internal circuit shown in FIG. 2 comprises a shift transistor comprising six D latches 121 to 126, two EXOR circuits 127 and 128, and one puncture circuit 129, and executes coding for outputting 2-bit data in response to 1-bit input data. (quantity of information)/(quantity of information after coding) is called as coding ratio and the cording ratio in this internal circuit is 1/2.

In the internal circuit shown in FIG. 2, the initially inputted 6-bit serial data is stored in the order of input in the D latches 121 to 126 respectively. Namely, serial data successively inputted by 7 bits is converted to 7-bit parallel data according to the six input data retained in the D latches 121 to 126 and a 1-bit input data further inputted therein. Then the newly inputted input data and data stored in the D latch 122, D latch 123, D latch 125 and D latch 126 are inputted into the EXOR circuit 127, and the data is subjected to computing for exclusive OR in the circuit.

For instance, when input data of "1" is inputted in succession to the input signals inputted in the order of "110110" into the shift register described above, data indicating "1" is outputted from the EXOR circuit 127, while data of "0" is outputted from the EXOR circuit 128, and the output data is used as 2-bit data of "10" via the puncture circuit 129.

Herein 6-bit output data can be obtained from the 3-bit input data successively inputted into this internal circuit, but to improve the transfer efficiency, sometimes only 4 bits obtained by thinning the 6-bit output data by 2 bits is outputted as sending data. In this case, the coding ration can be expressed as 3/4, and compared to the coding ratio of 1/2 the redundancy becomes lower with the transfer efficiency improved, but at the same time the error correction capability becomes lower. Therefore, it becomes possible to control redundancy by changing a degree of thinning of data, and this processing for thinning of data is called puncturing, and the puncturing circuit 129 is a circuit for executing this puncturing.

As also the TMC signal outputted from the TMCC signal generating circuit 106 must be multiplexed with a data stream such as an input signal TS for transfer, the processing for enabling the error correction as described above is executed. In FIG. 1, the TMCC signal outputted from the TMCC signal generating circuit 106 is inputted into the outer coding error control signal adding circuit 101, frame forming circuit 102, energy dispersal circuit 103, interleaver 104 and inner cording error control signal adding circuit 105, and is also inputted into the outer coding error control signal adding circuit 107.

The outer cording error control signal adding circuit 107 is a circuit for, like the outer cording error control signal adding circuit 101, outputting a signal with a redundancy signal for correcting an error in the units of byte added thereto in response to the inputted TMCC signal. A signal outputted from the outer cording control signal adding circuit 107 is inputted into the energy dispersal circuit 108, and is subjected to scrambling like in the energy dispersal circuit 103.

The signal scrambled in the energy dispersal circuit 108 is inputted into the inner coding error control signal adding circuit 109. The inner coding error control signal adding circuit 109 is a circuit for, like the inner cording error control signal adding circuit 105, adding a signal with a redundancy signal for correction of an error in the units of bit added thereto in response to an input signal.

A signal outputted from the inner cording error control signal adding circuit 105, namely a multiplexed data stream with redundancy added thereto, and a signal outputted from the inner coding error control signal adding circuit 109, namely a TMCC signal with redundancy added thereto are inputted into the modulating circuit 110 and a signal with a TNCC signal multiplexed to the frame formed as a new frame and is also subjected to digital modulation.

Digital modulation executed in the modulating circuit 110 could be amplitude modulation (ASK), frequency modulation (FSK), or phase modulation (PSK), but herein description is made with reference to digital phase modulation.

The digital phase modulation is a system in which digital data comprising bits of "0" or "1" correlated to a phase and information is transferred by switching this phase for the carrier waves. The digital phase modulating system is further classified into three systems of BPSK, QPSK (or 4PSK) and 8PSK according to a system of correlating a phase.

FIG. 3 is an explanatory view showing the digital phase modulating system. BPSK is a system in which, as shown in FIG. 3, for 1-bit digital data, for instance "0" is correlated to a phase difference of 0 degree and "1" is correlated to a phase difference of 180 degrees. QPSK is a system, for 2-bit digital data, for instance, "00", "01", "11", and "10" are correlated to a phase difference of 45 degrees, a phase difference of 135 degrees, a phase difference of 225 degrees and a phase difference of 315 degrees respectively.

Further, 8PSK is a system in which, for 3-bit digital data, for instance "000", "001", "011", "010", "100", "101", "111", "110" are correlated to a phase difference of 0 degree, a phase difference of 45 degree, a phase difference of 90 degree, a phase difference of 135 degree, a phase difference of 180 degree, a phase difference of 225 degree, a phase difference of 270 degree and a phase difference of 315 degree respectively.

Namely, by checking a phase state (transfer symbol) of a carrier wave, it is possible to transfer 1-bit information in BPSK, 2-bit information in QPSK, and 3-bit information in 8PSK. However, as the transfer efficiency becomes higher, adjacent transfer symbols come closer to each other, so that discrimination of one phase from another becomes difficult, which makes it easier for information error to occur, and because of this disadvantageous characteristics, any of the three phase modulating systems is selected according to the characteristics of information to be transferred.

As described above, in the digital phase modulation, sometimes various types of data based on these different systems are multiplexed, and the modulating circuit 110 executes phase modulation based on any of the three systems described above to each discrete data stream.

FIG. 4 is an explanatory view showing one example of configuration of a digital signal transferred from the transmitter described above. Especially, FIG. 4 shows an example of a digital signal in the digital satellite broadcasting. In this example, as a data stream, QPSK modulated stream with the coding ratio of 3/4, QPSK modulated stream with the coding ratio of 1/2, and BPSK modulated stream with the coding ratio of 1/2 are multiplexed. In the input signal TS described above, TS1, TS2 and TS3 correspond to the data streams respectively.

In FIG. 4, each row is called frame, and 8 frames are treated as one block of information. This block consisting of the 8 frames is called super frame, and the frames and super frames are formed in the frame forming circuit 102 described above. In addition, a synchronous word one is located at a head of each frame, and in succession to this synchronous word, TMCC signals (TMCC1 to TMCC6) are located up to the first 6 frames, and parity signals (parity 1 and parity 2) are located in the remaining two frames.

In succession to the TMCC signal (TMCC1) in the header frame, a synchronous word two is located, and the multiplexed data streams follow the synchronous word. In the frame other than the header frame a synchronous word three is located in succession to the TMCC signal or the parity signal and the multiplexed data streams follow this.

The synchronous word one is a signal defining a header of each frame, and a specific bit pattern indicating a header of a frame is given thereto. The TMCC signal located in succession to the frame head includes information for a transfer system for each of the multiplexed data streams (including redundancy information) and multiplexed information concerning positions (configuration arrangement). Further, the parity signal indicates redundancy added to a super frame, and is a redundancy signal based on Reed Solomon code added thereto in the outer coding error control signal adding circuit 101.

The synchronous word two indicates a header frame in a super frame, it is a signal defining a border between a TMCC signal and a data stream, and especially a specific bit pattern discriminated from a synchronous word three is given thereto.

Actually, a series of TMCC signals TMCC1 to TMCC 6 generated for one super frame are generated by the TMCC signal generating circuit 106 shown in FIG. 1. And the TMCC signal is outputted by the outer coding error control adding circuit 107 shown in FIG. 1 as a data array of TMCC1 to TMCC6+parities 1 and 2.

On the other hand, each of the input signals TS (TS1, TS2 and TS3) is outputted by the outer coding error control signal adding circuit 101 shown in FIG. 1 as TS+parity, and this data corresponds to the QPSK (3/4), QPSK (1/2) and BPSK (1/2) shown in FIG. 4 respectively. Namely, an outer coding parity is included in the QPSK (3/4), QPSK (1/2) and BPSK (1/2).

FIG. 5 is a block diagram showing general configuration of a receiving apparatus based on the conventional technology. FIG. 5 shows an example of a receiving apparatus for digital satellite broadcasting corresponding to the transmitting apparatus shown in FIG. 1. In FIG. 5, the receiving apparatus comprises a phase demodulating apparatus 130 comprising a phase demodulating circuit, and a transmitting code decoding apparatus 140.

The transmitting code decoding apparatus 140 comprises a Viterbi decoding circuit 131, a synchronism detecting circuit 132, an energy dispersal signal removing circuit 133 for decoding the TMCC signal, an outer coding error correcting circuit 134, a TMCC register 135, a deinterleaver 136 for decoding a data stream, an energy dispersal signal removing circuit 137, an outer coding error correcting circuit 138 and a TS selecting circuit 139.

A digital signal transmitted from a transmitting apparatus is received by the receiving apparatus, and at first is subjected to demodulation by the phase demodulating apparatus 130. The phase demodulating apparatus 130 is a circuit for extracting digital data from the received digital signal in a state before execution of modulation in the modulating circuit 110 in the transmitting apparatus, and in this example, digital phase demodulation is executed to a carrier wave subjected to digital phase modulation.

The signal demodulated by the phase demodulating apparatus 130 is inputted to the Viterbi decoding circuit 131 in the transmitting code decoding apparatus 140. The Viterbi decoding circuit 131 is a circuit for decoding a signal encoded by addition of a redundancy signal in the inner coding error control signal adding circuit 105 and inner coding error control signal adding circuit 109 in the transmitter, and especially decodes convolutional code.

The processing for decoding by the Viterbi decoding circuit 131 is a processing common to both the TMCC signal and the data stream included in a received digital signal, and the subsequent processing flow for a TMCC signal is different from that for a data stream, so that the processing for recognizing a TMCC signal and a data stream from a digital signal and extracting the recognized TMCC signal or data stream is required. Especially in a case of a data stream, a plurality of data streams are multiplied and the multiplexed data stream is transferred, so that, to extract each discrete data stream from the multiplexed data stream, information included in the TMCC signal is required.

The synchronism detecting circuit 132 is a circuit for receiving a signal decoded by the Viterbi decoding circuit 131 and for recognizing the TMCC signal and data stream described above. The TMCC signal and data stream recognized and extracted in the synchronism detecting circuit 132 is subjected to processing specific to each of the TMCC signal and data stream, but for the reasons described above, it is necessary to completely decode the TMCC signal before the data stream is completely decoded. Extraction of the TMCC signal by the synchronism detecting circuit 132 is executed by detecting the synchronous word one, synchronous word two, or synchronous word three in the super frame shown in FIG. 4.

The TMCC signal outputted from the synchronism detecting circuit 132 is inputted into the energy dispersal signal removing circuit 133. The energy dispersal signal removing circuit 133 is a circuit for removing a pseudo random signal added to the TMCC signal in the energy dispersal circuit 108 in the transmitting apparatus.

The TMCC signal from which a pseudo random signal is removed in the energy dispersal signal removing circuit 133 is then inputted into the outer coding error correcting circuit 134. The outer coding error correcting circuit 134 is a circuit for correcting an error in he TMCC signal encoded by the outer coding error control signal adding circuit 107 in the transmitting apparatus according to redundancy added thereto and obtaining only the original TMCC signal indicating transfer information for the data stream. It should be noted that, a Reed Solomon decoding circuit is used as the outer coding error correcting circuit 134 when Reed Solomon code is used in the transmitting apparatus.

The TMCC signal obtained by the outer coding error correcting circuit 134 is stored in a TMCC register 135, and the TMCC signal stored in this TMCC register 135 is used for decoding a data stream extracted in the synchronism detecting circuit 132. It should be noted that, the transfer information such as a redundancy degree or a pseudo random initial value required for decoding of a TMCC signal is previously obtained by the receiving apparatus.

The data stream extracted in the synchronism detecting circuit 132 is inputted into the deinterleaver 136. The deinterleaver 136 returns a sequence of the data stream to the original one by canceling rearrangement executed by the interleaver 104 in the transmitting apparatus.

The data stream restored by the deinterleaver 136 is then inputted into the energy dispersal signal removing circuit 137. The energy dispersal signal removing circuit 137 is a circuit for, like the energy dispersal signal removing circuit 133, removing a pseudo random signal added to a data stream in the energy dispersal circuit 103 in the transmitting apparatus.

The data stream from which the pseudo random signal is removed in the energy dispersal signal removing circuit 137 is then inputted into the outer coding error correcting circuit 138. The outer coding error correcting circuit 138 is a circuit for correcting an error in a data stream encoded in the outer cording error control signal adding circuit 101 in the transmitting apparatus, like the outer coding error correcting circuit 134, according to the TMCC signal stored in the TMCC register 135.

The data stream having been subjected to error correction in the outer coding error correcting circuit 138 is inputted into the TS selecting circuit 139. The TS selecting circuit 139 is a circuit for extracting each discrete data stream from a multiplexed data stream according to the TMCC signal stored in the TMCC register 135 and selecting a desired data stream, namely any of the input signals TS inputted by the transmitting apparatus.

The TS signal selected and outputted from the TS selecting circuit 139 is inputted into an MPEG decoding circuit (not shown) in the downstream therefrom to enable display of a motion picture on a display unit.

In the processing for receiving signals described above, existence of a TMCC signal is always necessary for decoding a multiplexed data stream, but irrespective of the fact that a TMCC signal included in a received digital signal is not different from the TMCC signal already stored in the TMCC register 135, namely that the TMCC signal has not been updated, the TMCC signal is rewritten in the TMCC register each time, which disadvantageously caused increase in power consumption.

To eliminate the unnecessary data write processing as described above, a method is conceivable in which all of bits in a newly received TMCC signal are compared to all bits in the TMCC signal already stored in the TMCC register 135 to check an updating state of the TMCC signal. FIG. 6 is a block diagram showing general configuration of a conventional type of TMCC obtaining circuit for comparing all of TMCC signals to each other. This TMCC obtaining circuit is a circuit for replacing the TMCC register 135 in the receiving apparatus described above.

In FIG. 6, assuming, for instance, that a TMCC signal indicating transfer information for a data stream comprises 379 bits, a 379-bit TMCC signal newly received and inputted into the TMCC obtaining circuit is once inputted into a buffer 141. Then a TMCC signal outputted from this buffer 141 and the TMCC signal already stored in the register 142 are inputted into a comparing circuit 143.

The comparing circuit compares all of 379 bits in each of the two types of TMCC signals inputted therein bit by bit to each other, and when the two TMCC signals are inconsistent outputs a signal as a write instruction. When the register 142 receives a signal indicating a write instruction from the comparing circuit 143, the TMCC signal stored in the buffer 141 is written in the register 142. With this operation, the processing for updating of the TMCC signal is complete and the data stream is decoded according to this TMCC signal.

However, to compare all bits in each of TMCC signals composed of, for instance, 379 bits bit by bit to each other a large scale comparing circuit 143 is required, which makes it impossible to downsize the entire receiving apparatus, and further a large power is required to operate the large scale comparing circuit 143 as described above, which in turn disadvantageously increases the power consumption.

To solve the problems as described above, a method is conceivable in which updating instruction information for a TMCC signal is added to each TMCC signal and only the updating instruction information added to each TMCC signal is compared to each other to reduce a work load on the comparing circuit 143. FIG. 7 is a block diagram showing general configuration of the TMCC obtaining circuit based on the conventional technology for comparing the updating instruction information to each other. Herein it is assumed that the updating instruction information is numerical information comprising 5 bits and the updating instruction information is added to the header of each of 379-bit TMCC signal with the multiplexed TMCC signal transferred from a transmitting apparatus.

In FIG. 7, in the TMCC signal comprising 379+5 bits obtained by adding the 5-bit updating instruction information to a 379-bit TMCC signal, the header 5-bit corresponding to the updating instruction information is retained in an updating instruction information retaining area 153, while 379 bits corresponding to the original TMCC signal is retained in the buffer 151. The updating instruction information outputted from this updating instruction information retaining area 153 and updating instruction information already stored in the updating instruction information storing area 154 are inputted into the comparing circuit 155.

The comparing circuit 155 compares the two types of updating instruction information inputted therein to each other, and when the two types of updating instruction information are inconsistent outputs a signal as a write instruction. Especially, by previously deciding, for instance, that, when the TMCC signal is updated in the sending side, a numeral value of the 5-bit updating instruction information is increased by 1, and this can be used to determine whether the TMCC signal has been updated or not. The register 152 receives a signal indicating a write instruction from the comparing circuit 155, and then writes the TMCC signal retained in the buffer 151 in the register 152. With this operation, the processing for updating the TMCC signal is complete and the data stream is decoded according to this updated TMCC signal.

With this configuration, it is possible to determined whether updating of a TNCC signal is required or not by comparing only 5 bits in each of the TMCC signals to each other in the comparing circuit 155, and the scale of a circuit as the comparing circuit 155 does not cause a problem.

However, when turning ON a power for a receiving apparatus for activating it, generally all bits of the register for storing the updating instruction information are set to a fixed value such as "0". In this step, if the updating instruction information newly received accidentally coincides to this fixed value of "0" the comparing circuit 155 determines that the newly received updating instruction information is coincident to that already stored in the register, and a signal as a write instruction to the register is not outputted, which creates problems in practical operation.

In a case of a numerical value indicating the updating instruction information, whether each TMCC signal has been updated or not can be determined continuously for the same carrier wave, but if a receiving carrier wave is switched to another one, even if actually an updated TMCC signal is transmitted and when updating instruction information newly received accidentally coincides to the updating instruction information stored when the carrier wave before switching to a new one was received the write instruction signal is not outputted from the comparing circuit 155. Namely, in the case as described above, there occurs the problem that, although a TMCC signal has been updated a data stream is not decoded according to the new TMCC signal.

To solve the problem described above, a method is conceivable in which, when an image signal is not detected for a long period of time in the MPEG decoding circuit or the like in the downstream therefrom, an abnormal state detection signal is inputted to compulsorily rewrite the TMCC signal stored in a register. FIG. 8 is a block diagram showing general configuration of a TMCC obtaining circuit based on the conventional technology in which an abnormal state detection signal is issued in the case as described above.

In FIG. 8, there is provided an OR circuit 160 which outputs a write signal to the register 152 when an inconsistency signal is outputted from the comparing circuit 155, or when an abnormal state detection signal is outputted from the MPEG decoding circuit or the like.

However, in the method based on the conventional technology, a certain period of time is required for detecting an error in an image signal in the MPEG decoding circuit or the like, so that a long period of time is required for determination as to whether each TMCC signal has been updated or not and until a normal image is displayed, and during this a normal image is not outputted, which sometimes causes misunderstanding that, for instance, a broadcasting accident has occurred. As described above, in any of the TMCC signal obtaining circuit (method) based on the conventional technology as described above, it is not possible to quickly and efficiently obtain a TMCC signal.

SUMMARY OF THE INVENTION

It is an object of the present invention to make it possible to quickly and efficiently obtain a TMCC signal as a data configuration control signal with simple and small-scale configuration.

With the present invention, when a decoding complete signal outputted from a decoding complete signal outputting unit first after a synchronism detection signal indicating detection of synchronism of a digital signal outputted from the synchronism detecting unit is received, a TMCC signal is updated by a data configuration control signal updating unit, so that, for instance when power supply to a receiving apparatus is started and the receiving apparatus is activated or when synchronism is established again, for instance, after a carrier wave is changed, updating of the TMCC signal can be executed simultaneously when decoding of the TMCC signal is complete first, and because of this configuration, it becomes possible to quickly obtain the latest TMCC signal with small-scale circuit configuration.

According to one feature of the present invention, there are provided a pulse outputting unit and a synchronous state maintaining unit and in the state where a synchronism detection signal has been inputted and the synchronous state is maintained and further a decoding complete signal is inputted then the TMCC signal used for decoding a data stream is updated to the newly received TMCC signal. Therefore, when power supply to a receiving apparatus is started and the receiving apparatus is activated or when synchronism is established again after a carrier wave is changed to another one, updating of the TMCC signal can be executed when decoding of a TMCC signal is complete first, hence, it becomes possible to quickly obtain the latest TMCC signal with small-scale circuit configuration.

According to one feature of the present invention, there is provided a data configuration control signal updating unit for changing a TMCC signal used for decoding a data stream to a newly received TMCC signal in the state when a synchronism detection signal shows a synchronous state, when a comparison signal outputted according to a result of comparison between updating instruction information already stored and updating instruction information newly received and decoded indicates inconsistency, and at the same time when a decoding complete signal indicates completion of decoding of the TMCC signal. Therefore, after a TMCC signal is updated once after detection of synchronism of a digital signal, only when the newly received updating instruction information is different from the updating instruction information already stored the updating of the TMCC signal is executed, Hence, it becomes possible to efficiently and quickly obtain the latest TMCC signal.

According to one feature of the present invention, as a synchronism detection signal inputted into the data configuration control signal updating unit a recognized state signal indicating the state where recognition of a data stream and a TMCC signal is complete is used, so that a circuit already existing in the receiving apparatus can be used without adding a circuit for outputting a synchronism detection signal. Therefore, it becomes possible to prevent the apparatus configuration from becoming more complicated and also to always obtain the latest TMCC signal with a small-scale configuration.

According to one feature of the present invention, as the synchronism detection signal inputted into the data configuration control signal updating unit a signal indicating completion of demodulation of a digital signal outputted from a digital demodulating circuit is used, so that a circuit already existing in the receiving apparatus can be used without adding a circuit for outputting a synchronism detection signal. Therefore, it becomes possible to prevent the apparatus configuration from becoming more complicated and also to always obtain the latest TMCC signal with a small-scale configuration.

According to one feature of the present invention, as the synchronism detection signal inputted into the data configuration control signal updating unit a signal indicating a phase-demodulated state of a digital signal outputted from a digital phase-demodulating circuit is used, so that a circuit already existing in the receiving apparatus can be used without adding a circuit for outputting a synchronism detection signal. Therefore, it becomes possible to prevent the apparatus configuration from becoming more complicated and also to always obtain the latest TMCC signal with a small-scale configuration.

According to one feature of the present invention, there is provided a selecting unit for selecting either a recognized state signal outputted from the synchronism detecting unit or a demodulate state signal outputted from a digitally demodulating unit and outputting the selected signal as a synchronism detection signal into the data configuration control signal updating unit so that various types of signals each indicating a synchronous state previously prepared in a receiving apparatus can be used according to the current situation. Therefore, it can be determined more flexibly as to whether updating of a TMCC signal has been executed or not.

According to one feature of the present invention, there is provided a selecting unit for selecting either a recognized state signal outputted from the synchronism detecting unit or a demodulated state signal outputted from a digitally phase-modulating unit and outputting the selected signal as the synchronism detection signal into the data configuration control signal updating unit, so that various types of signals each indicating a synchronous state previously prepared in a receiving apparatus can be used according to the current situation. Therefore, it can be determined more flexibly as to whether updating of a TMCC signal has been executed or not.

According to one feature of the present invention, a TMCC signal is updated when decoding of a TMCC signal is completed first after synchronism of a digital signal is detected. Thus, updating of a TMCC signal is executed when decoding of a TMCC signal is completed first after power supply to a receiving apparatus is started and the receiving apparatus is activated or when a carrier wave is switched to another one. Therefore, it is possible to quickly and efficiently obtain the latest TMCC signal.

According to one feature of the present invention, when decoding of a TMCC signal included in a received digital signal is complete after synchronism of the received digital signal is detected and in the state where updating instruction information already stored is not coincident to newly received updating instruction information, a TMCC signal used for decoding a data stream is changed to the newly received TMCC signal. Thus, after a TMCC signal is updated first after synchronism of a digital signal is detected, only when the newly received updating instruction information is different from the updating instruction information already stored, updating of a TMCC signal can be executed, therefore, it is possible to efficiently and quickly obtain a TMCC signal.

Other objects and features of this invention will become apparent from the following description with reference to the accompanying drawings.

BRIEF DESCRIPTION OF THE DRAWINGS

FIG. 3 is an explanatory view showing a digital phase-demodulation system;

DESCRIPTION OF THE PREFERRED EMBODIMENTS

Detailed description is made for preferred embodiment of a receiving apparatus as well as for a receiving method according to the present invention with reference to the attached drawings. It should be noted that, the present invention is not limited by these embodiments.

Figure 1:
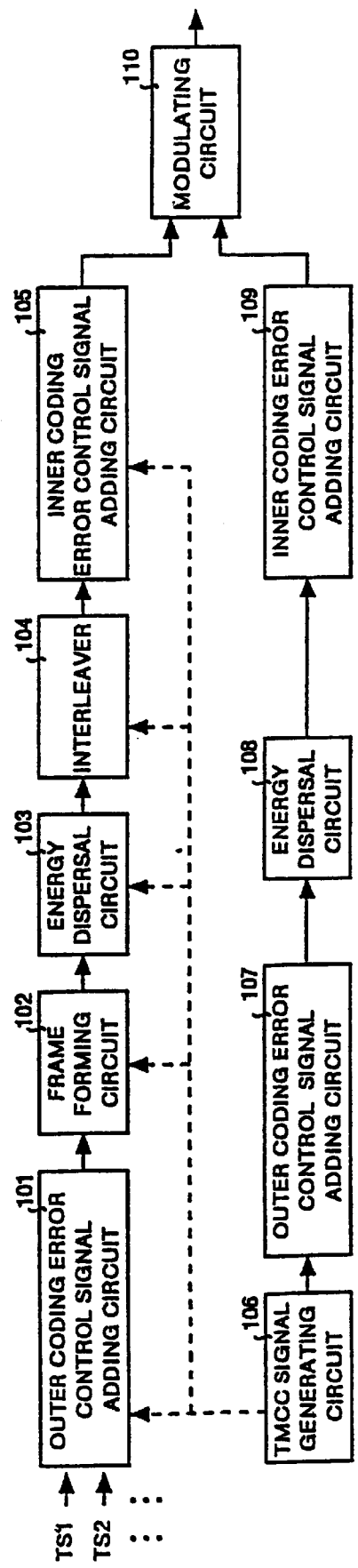
FIG. 1 is a block diagram showing general configuration of a transmitting apparatus based on the conventional technology.
Figure 2:
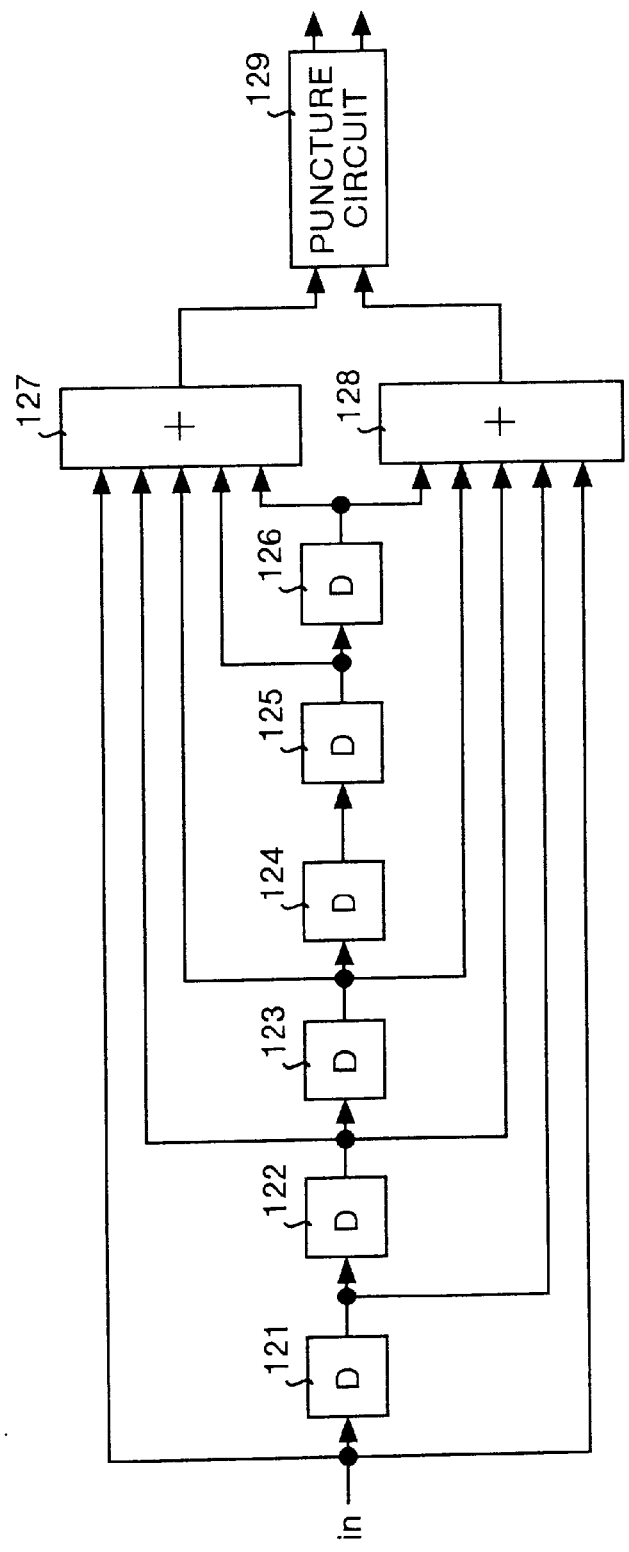
FIG. 2 is a block diagram showing general configuration of an internal circuit for adding convolutional code in an inner coding error signal adding circuit.
Figure 4:
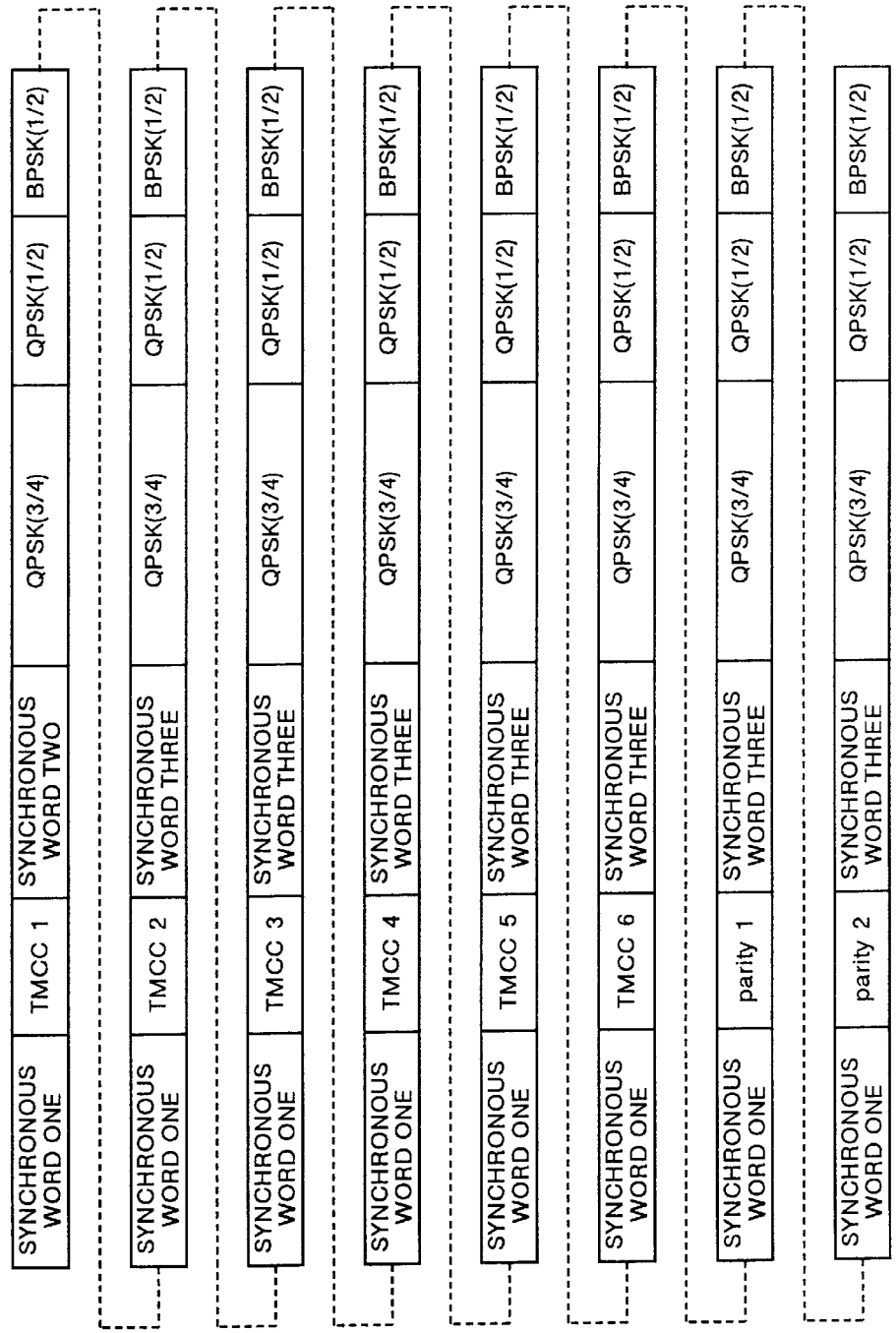
FIG. 4 is an explanatory view showing an example of configuration of a digital signal transferred from the transmitting apparatus.
Figure 5:
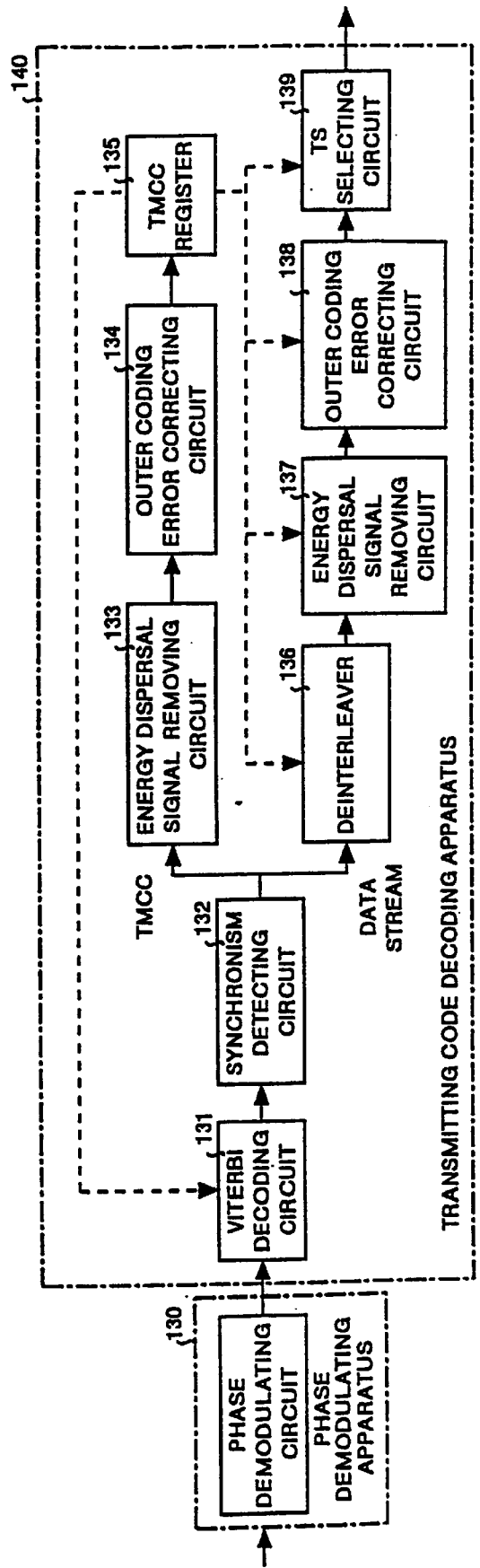
FIG. 5 a block diagram showing general configuration of a receiving apparatus based on the conventional technology.
Figure 6:
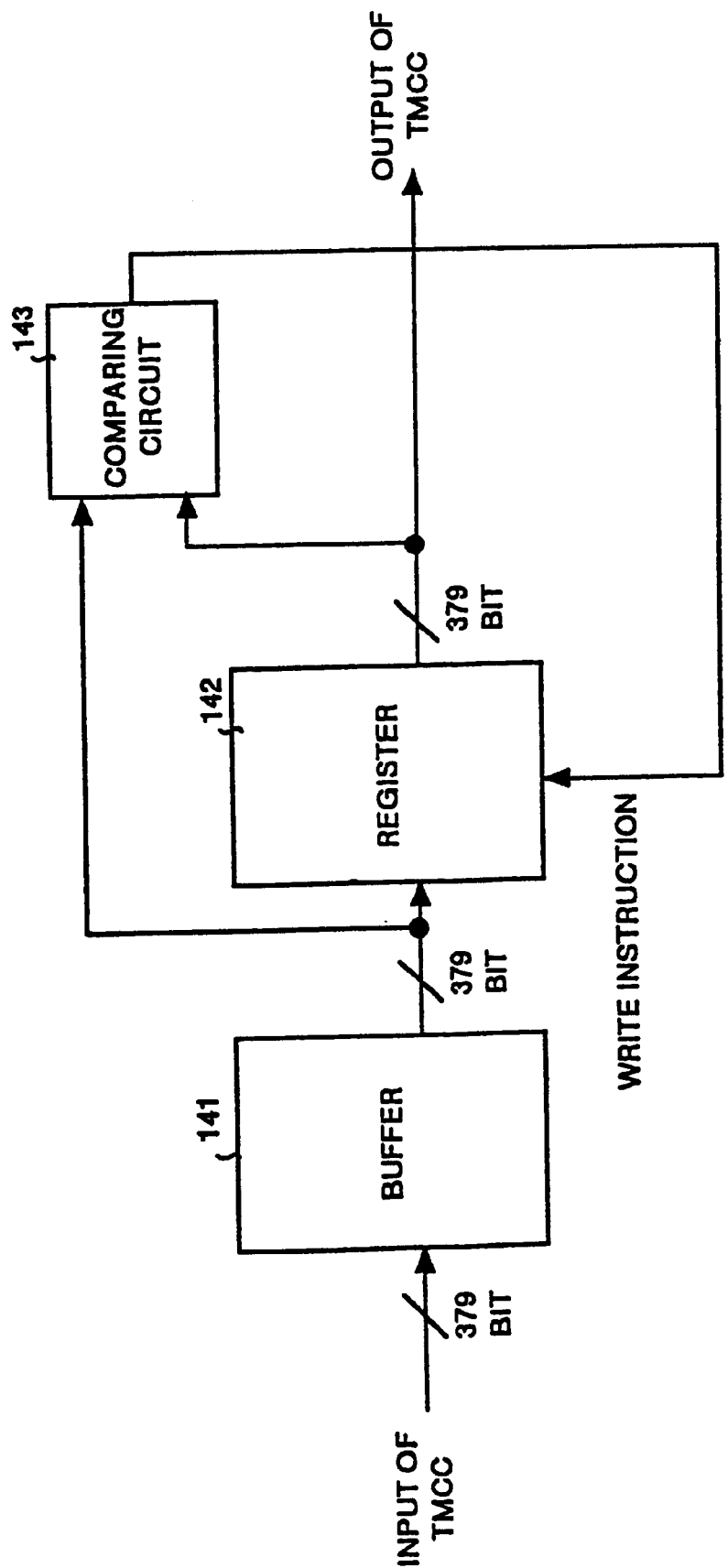
FIG. 6 is a block diagram showing general configuration of a TMCC obtaining circuit based on the conventional technology.
Figure 7:
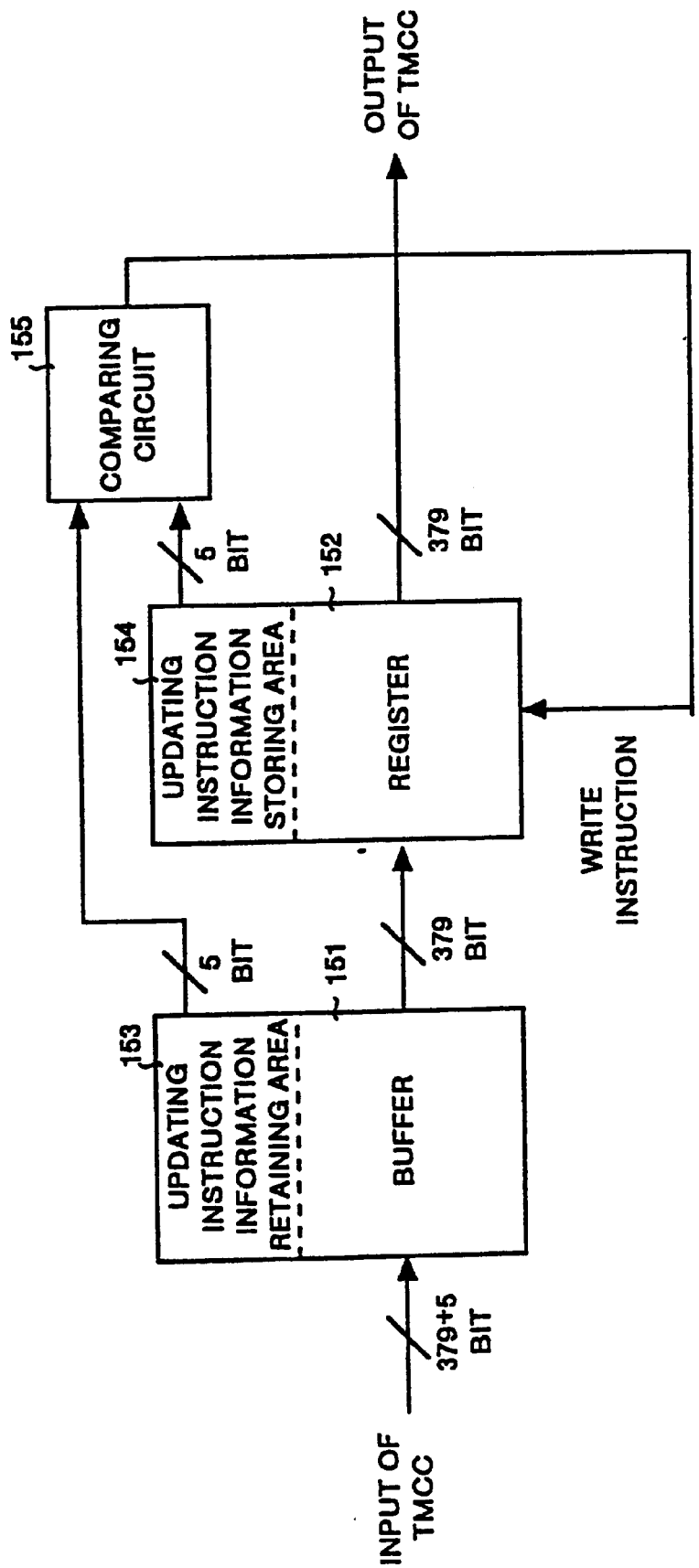
FIG. 7 is a block diagram showing another general configuration of the TMCC obtaining circuit based on the conventional technology.
Figure 8:
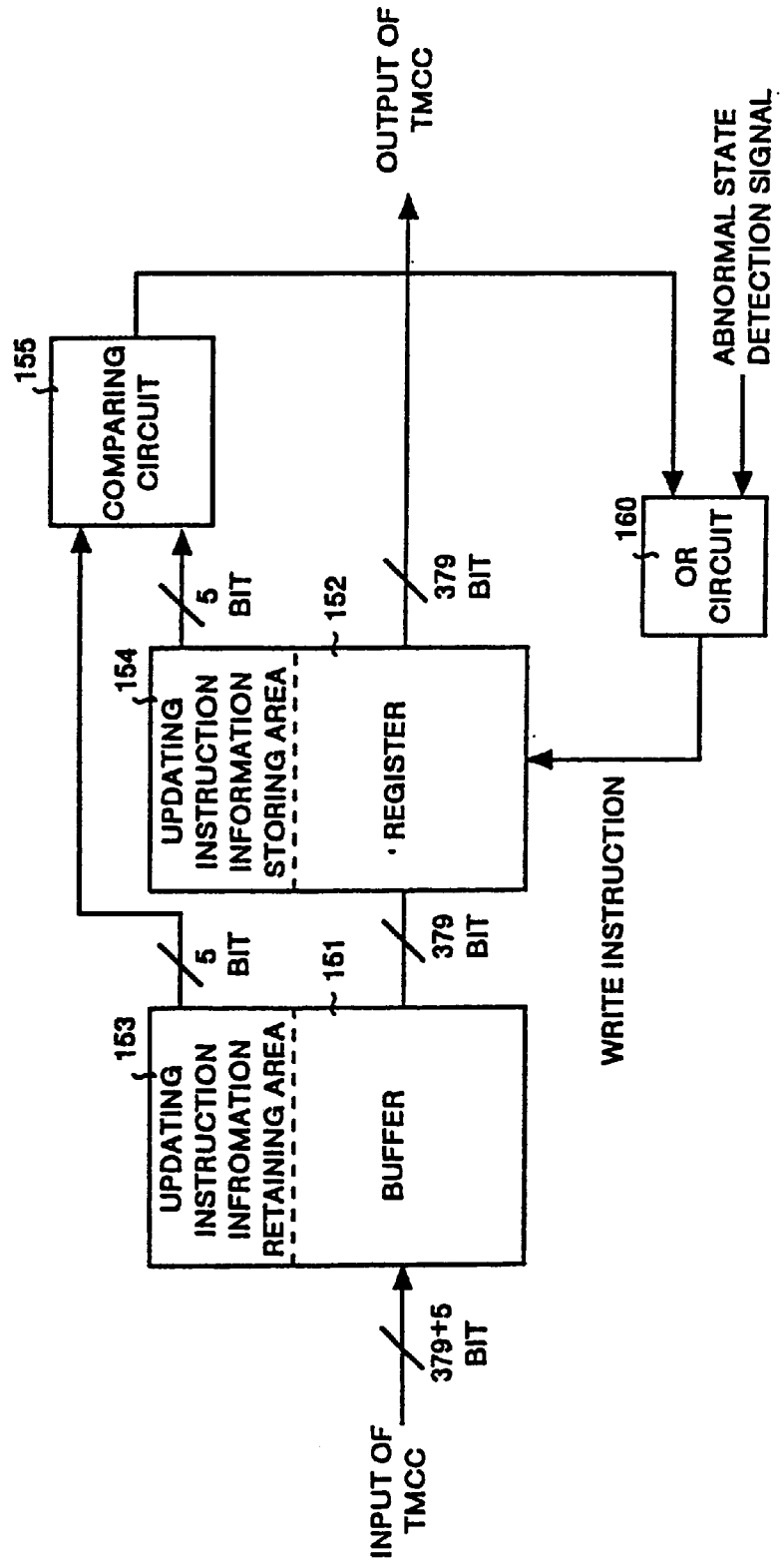
FIG. 8 is a block diagram showing still another general configuration of the TMCC obtaining circuit based on the conventional technology.

A receiving apparatus according to Embodiment 1 of the present invention is characterized in the configuration of TMCC obtaining circuit (corresponding to the TMCC register 135 in FIG. 5), since the other configuration is the same as that shown in FIG. 5 the description of this portions is omitted. Description is made hereinafter for configuration and operations of the TMCC obtaining circuit of the receiving apparatus according to Embodiment 1.

Figure 9:
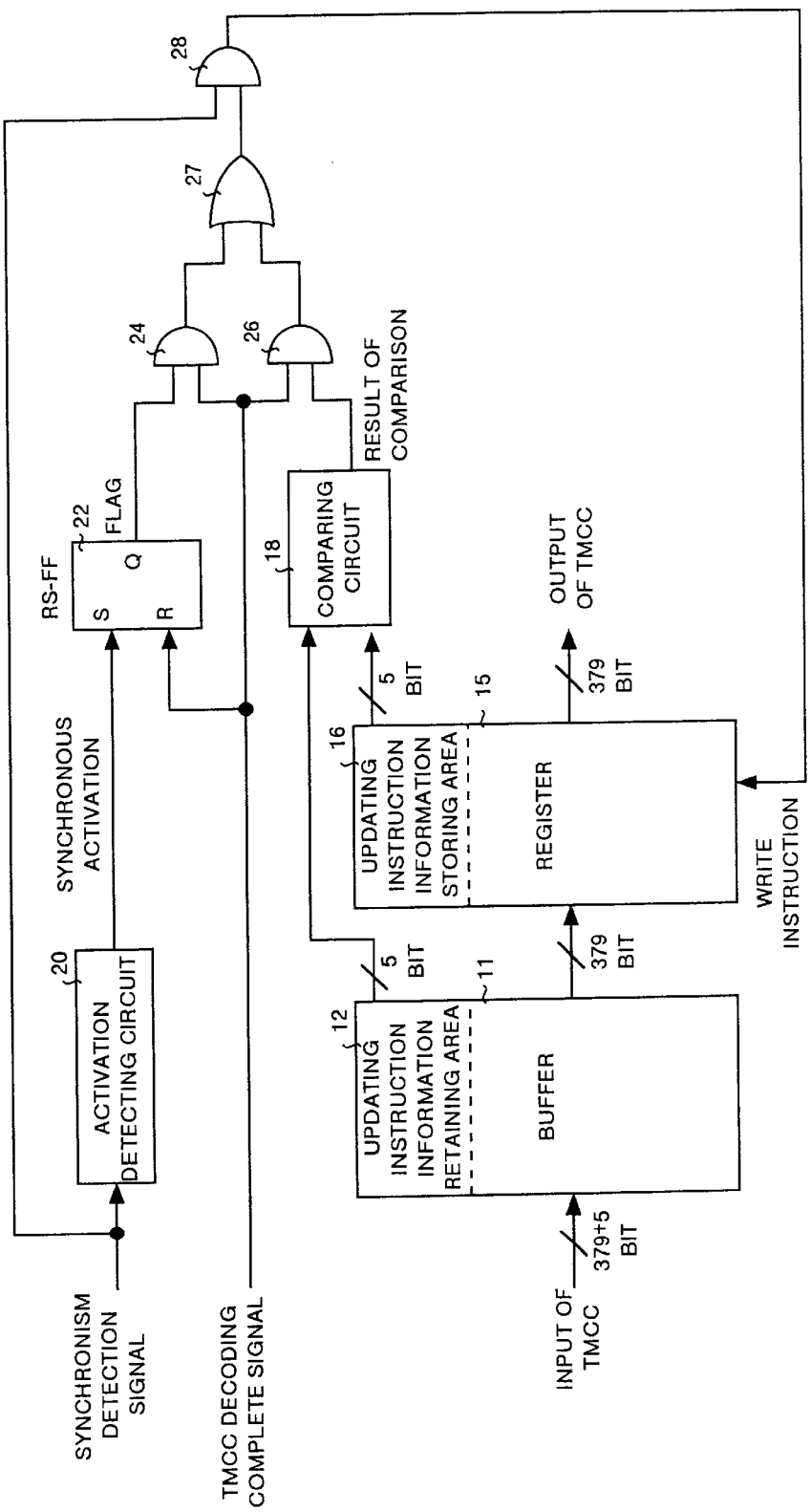
FIG. 9 is a block diagram showing general configuration of a TMCC obtaining circuit in a receiving apparatus according to Embodiment 1 of the present invention.

FIG. 9 is a block diagram showing general configuration of the TMCC obtaining circuit in the receiving apparatus according to Embodiment 1. In FIG. 9, the TMCC obtaining circuit comprises a buffer 11, a register 15, a comparing circuit 18, an activation detecting circuit 20, a flip-flop (RS-FF) 22, three AND gates 24, 26, 28 and one OR gate 27.

Herein a TMCC signal (379 bits) multiplexed to a digital signal to be transmitted indicates transfer information for a data stream, and further an updating instruction information (5 bits) indicating whether the TMCC signal has been updated or not is added to the TMCC signal.

The buffer 11 temporally retains a newly received TMC signal, and the register 15 stores therein a TMCC signal used for encoding a data stream. The buffer 11 includes an updating instruction information retaining area 12 for temporally retaining an updating instruction information constituting the TMCC signal along with a TMCC signal stored in the buffer 11. The register 15 includes an updating instruction information storing area 16 for storing therein an updating instruction information when the TMCC signal is received along with a TMCC signal stored in the register 15.

The comparing circuit 18 is a circuit for receiving the updating instruction information stored in the updating instruction information retaining area 12 and updating instruction information stored in the updating instruction information storing area 16 and comparing the two types of updating instruction information to each other, and also for outputting, for instance, "H" level signal when a result of the comparison indicates that the two types of updating instruction information are inconsistent. With this operation, it is recognized that the newly received TMCC signal is an updated one.

The updating instruction information is expressed as a numerical value consisting of, for instance 5 bits, and indicates that a TMCC signal has been updated when the numerical value is incremented by 1 in the transmitting side. Namely, the 5-bit updating instruction information typically starts from "00000", and is gradually incremented to "00001", "00010", . . . , and then returns to "00000" when the numerical value reaches "11111".

In this case, the comparing circuit 18 compares a 5-bit numerical value indicating the updating instruction information stored in the updating instruction information retaining area 12 to a 5-bit numeral value indicating the updating instruction information stored in the updating instruction information storing area 16, and determines whether the two types of updating instruction information are identical or not by checking whether the 5-bit numerical value indicating the updating has been updated from the 5-bit numerical value indicating an increment by 1 or more. The signal outputted from the comparing circuit 18 is inputted into one of two input terminals of the AND gate 26.

The activation detecting circuit 20 is a circuit for receiving a synchronism detection signal and outputting a pulse for a certain period of time during activation of a pulse of the synchronism detection signal, and is realized with a one-shot multivibrator or the like. The synchronism detection signal is a signal indicating a synchronous state and is outputted from a demodulating circuit such as the phase demodulating apparatus provided in a receiving apparatus based on the conventional technology or the like or from a synchronism detecting circuit 132 identifying a TMCC signal and a data stream in a received digital signal. The state of the synchronism detection signal at the time of activation ("H" level signal) is defined herein as a state where phase synchronism has been established in the phase demodulating circuit, or as a state where frame synchronism has been established in the synchronism detecting circuit.

This synchronism detection signal is inputted into the activation detecting circuit 20 and also into one input terminal of the AND gate 28. The pulse outputted from the activation detecting circuit 20 is inputted into a set (S) terminal of the RS-FF 22. On the other hand, a TMCC decoding complete signal is inputted into a reset (R) terminal of the RS-FF 22. The signal (Q) stored in the RS-FF 22 is inputted into one of the input terminals of the AND gate 24 as a flag signal.

The TMCC decoding complete signal is a signal indicating completion of decoding of a TMCC signal in the TMCC decoding circuit provided in a receiving apparatus based on the conventional technology (a circuit having a combined configuration of the energy spread signal removing circuit 133 and the outer coding error correcting circuit 134 shown in FIG. 5), and indicates, for instance, completion of decoding at activation state ("H" level state).

The TMCC decoding complete signal is inputted into the reset (R) terminal of the RS-FF 22, and at the same time is inputted into the other input terminal of the AND gate 24 as well into the other input terminal of the AND gate 26.

Output from the AND gate 24 and output from the AND gate 26 are both inputted into the OR gate 27. Output from the OR gate 27 is inputted into the other input terminal of the AND gate 28. A signal outputted from the AND gate 28 is inputted as a write instruction signal into the register 15. When the write instruction signal indicates, for instance, "H" level, the TMCC signal retained in the buffer 11 is written in the register 15.

With the configuration as described above, a signal level of the write instruction signal outputted from the AND gate 28 is decided according to the synchronous state of a received digital signal, a state where decoding of a TMCC signal is completed, as well as to a result of comparison between a newly received updating instruction information and updated instruction information already stored.

The description of the receiving apparatus according to Embodiment 1 of the present invention is also made on the assumption that a TMCC signal comprising 379 bits and a 5-bit updating instruction information added to a header of this TMCC signal are received.

Figure 10:
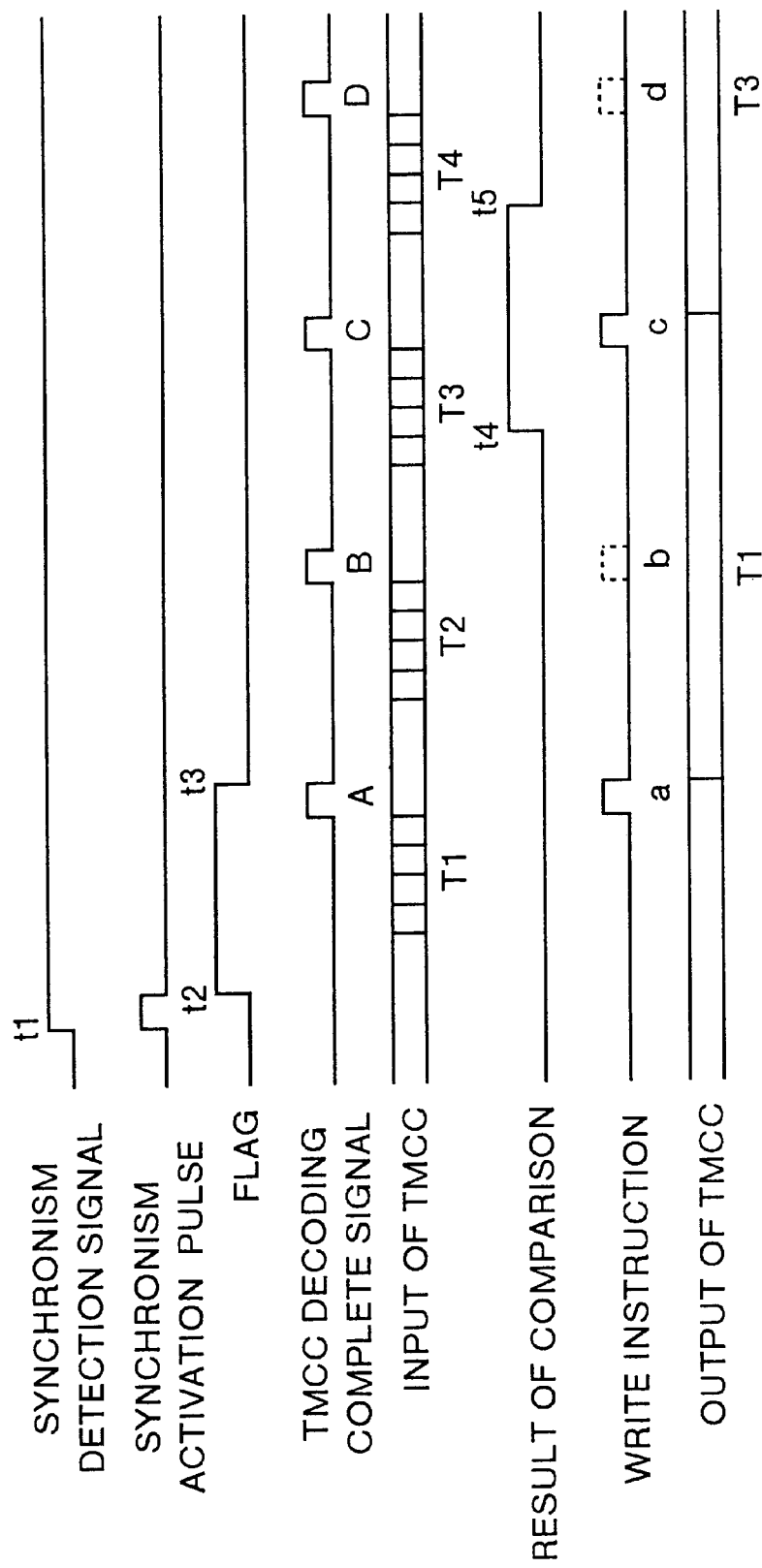
FIG. 10 is a time chart showing an operation of the receiving apparatus according to Embodiment 1.

Next, description is made for operations of this receiving apparatus. FIG. 10 is a time chart showing operations of the receiving apparatus according to Embodiment 1. In FIG. 10, at first, when power supply to a receiving apparatus is started and the receiving apparatus is activated, or when synchronism is again established after a carrier wave is switched to another one, synchronism is detected by the phase demodulating apparatus 130, synchronism detecting circuit 132 or the like, and a synchronism detection signal indicating that the signal level has been switched from "L" level to "H" level is inputted into the activation detecting circuit 20 (t1).

The activation detecting circuit 20 outputs a synchronism activation pulse for a certain period of time based on the timing of activation of the synchronism detection signal as a trigger. This pulse is inputted into the set terminal of the RS-FF 22. In this step, as synchronism of the digital signal received in the receiving apparatus has just been established, decoding of the TMCC signal is still not complete, and the TMCC decoding complete signal still indicating "L" level is inputted into the reset terminal of the RS-FF 22. The RS-FF 22 is set to "H" level signal according to "H" level signal inputted to the set terminal and "L" level signal inputted to the reset terminal of the RS-FF 22. Then simultaneously with the end of the synchronism activation pulse, "H" level state is maintained in the RS-FF 22 (t2). The signal retained in the RS-FF 22 is outputted as a flag signal for "H" level.

In this state, the AND gate 24 receives a flag signal of "H" level and a TMCC decoding complete signal of "L" level, and outputs a signal of "L" level. As the TMCC decoding complete signal of "L" level is inputted into the other input terminal of the AND gate 26, and AND gate 26 outputs a signal of "L" level. Thus, the OR gate 27 receives a signal of "L" level and outputs a signal of "L" level. Output of the OR gate 27 is connected to the other input terminal of the AND gate 28, so that the AND gate 28 also outputs a signal of "L" level, and this signal is inputted as a write instruction signal of "L" level into the register 15.

During this period, the TMCC signal is decoded by the TMCC decoding circuit described above to 379+5-bit data comprising a TMCC signal and updating instruction information, and is gradually inputted into and retained in the buffer 11 from the decoded portion. Finally, the 379-bit TMCC signal is retained in the buffer 11, while the updating instruction information is retained in the updating instruction information retained area 12 ("T1" in input of TMCC).

Then a pulse "A" is outputted as the TMCC decoding complete signal from the TMCC decoding circuit. During the activation state of the pulse "A", namely during "H" level state, output from the AND gate 25 is "H" level, and in association with this signal level shift output from the OR gate 27 also enters "H" level. As the synchronism detection signal is still indicating "H" level, output from the AND gate 28 indicates "H" level, and a write instruction signal of "H" level (pulse "a" in a write instruction) is inputted into the register 15.

When a write instruction signal of "H" level is received, the register 15 writes the TMCC signal retained in the buffer 11 in the register 15 itself. With this operation, updating of the TMCC signal is complete. The TMCC signal written in the register 15 is used for decoding a data stream as an effective TMCC signal.

On the other hand, the RS-FF 22 is reset to "L" level signal according to the end of the synchronism activation pulse, namely "L" level state, as well as according to the activation of the pulse "A" in the TMCC decoding complete signal, namely "H" level state. Then the RS-FF 22 maintains "L" level state according to fall of the pulse "A" in the TMCC decoding complete signal, namely according to signal level shift to "L" level state, and outputs a flag signal for "L" level (t3).

Therefore, output from the AND gate 24 enters "L" level, and output from the AND gate 26 also enters "L" level according to the TMCC decoding complete signal of "L" level. In association with this, output from the OR gate 27 indicates "L" level, and output from the AND gate 28, namely the write instruction signal shifts to "L" level. Further, a write instruction signal "a" synchronized to the pulse "A" in the TMCC decoding complete signal can be generated.

With the operations described above, in the state where power supply to a receiving apparatus is started and the receiving apparatus is activated, or where synchronism is again established after a carrier wave is changed to another one, updating of a TMCC signal can be executed at a high speed when the first TMCC signal after detection of synchronism of a digital signal has been decoded.

Then a case is considered in which a new TMCC signal ("T2" in input of TMCC) is inputted in the state where the synchronism detection signal maintains "H" level, namely in the state where synchronism of a digital signal has been established by the phase demodulating apparatus 130, synchronism detecting circuit 132 or the like shown in FIG. 5.

The newly received TMCC signal is decoded by the TMCC decoding circuit and is outputted as a TMCC signal, and the TMCC decoding circuit outputs a TMCC decoding complete signal indicating completion of decoding as a pulse "B". During this, as the activation detecting circuit 20 outputs a pulse with only one shot during the activation of the synchronism detection signal, so that a signal at "L" level is continuously inputted into the set terminal of the RS-FF 22, and even during the activation state of the pulse "B", namely even if a signal of "H" level is inputted into the reset terminal of the RS-FF 22, a flag signal as output from the RS-FF 22 continuously indicates "L" level. Therefore, output from the AND gate 24 indicates "L" level, while output from the OR gate 27 is decided according to a level of output from the AND gate 26.

The other input terminal of the AND gate 26 receives a TMCC decoding complete signal of "H" level, but the output level is decided according to a level of a signal inputted to another input terminal thereof, namely to a level of the output from the comparing circuit 18.

Herein, when a numerical value indicating updating instruction information newly inputted into the updating instruction retaining area 12 is the same as a numerical value indicating updating instruction information already stored in the updating instruction storing area 16, the comparing circuit 18 outputs a comparison result signal of "L" level indicating coincidence of the two types of updating instruction information. According to the comparison result signal of "L" level, output from the AND gate 26 indicates "L" level, and output from the OR gate 27 indicates "L" level. Therefore, output from the AND gate 28 also enters "L" level, and the TMCC signal is not written by the register 15 (This state corresponds to the position "b" indicating that a pulse for a write instruction is not generated).

If a new TMCC signal ("T3" in input of TMCC) is further inputted, the TMCC decoding circuit outputs a TMCC decoding complete signal indicating completion of decoding as a pulse "C". In this step, output level of the RS-FF 22, AND gate 24 and AND gate 26 is the same as that of the pulse "B" described above, so that detailed description thereof is omitted herein.

When a numerical value indicating updating instruction information newly inputted into the updating instruction information retaining area 12 is not coincident to a numerical value indicating updating instruction information already stored in the updating instruction storing area 16, the comparing circuit 18 outputs a comparison result signal of "H" level indicating that the two types of updating instruction information are not coincident to each other (t4). According to the comparison result signal of "H" level, output from the AND gate 26 indicates "H" level, and output from the OR gate 27 also indicates "H" level. Further, output from the AND gate 28 enters "H" level, and a write instruction signal (pulse "c") is inputted into the register 15, so that the TMCC signal is written by the register 15.

The "H" level of the comparison result signal again shifts to "L" level when a next new TMCC signal ("T4" in input of TMCC) is inputted and a result of comparison by the comparing circuit 18 indicates that updating instruction information in the newly received TMCC signal is coincident to that in the updating instruction information already retained, namely when a numerical value indicating the updating instruction information stored in the updating instruction information storing area 16 is the same and coincident to a numerical value indicating the updating instruction information retained in the updating instruction information retaining area 12 (t5). It should be noted that, the state of the pulse "D" in the TMCC decoding complete signal is the same as that of pulse "B" and description thereof is omitted herein.

With the operations described above, in a receiving apparatus, once updating of a TMCC signal is executed after synchronism of a digital signal is detected, the high speed processing for updating a TMCC signal is made only when newly received updating instruction information is different from updating instruction processing already stored.

Figure 11:
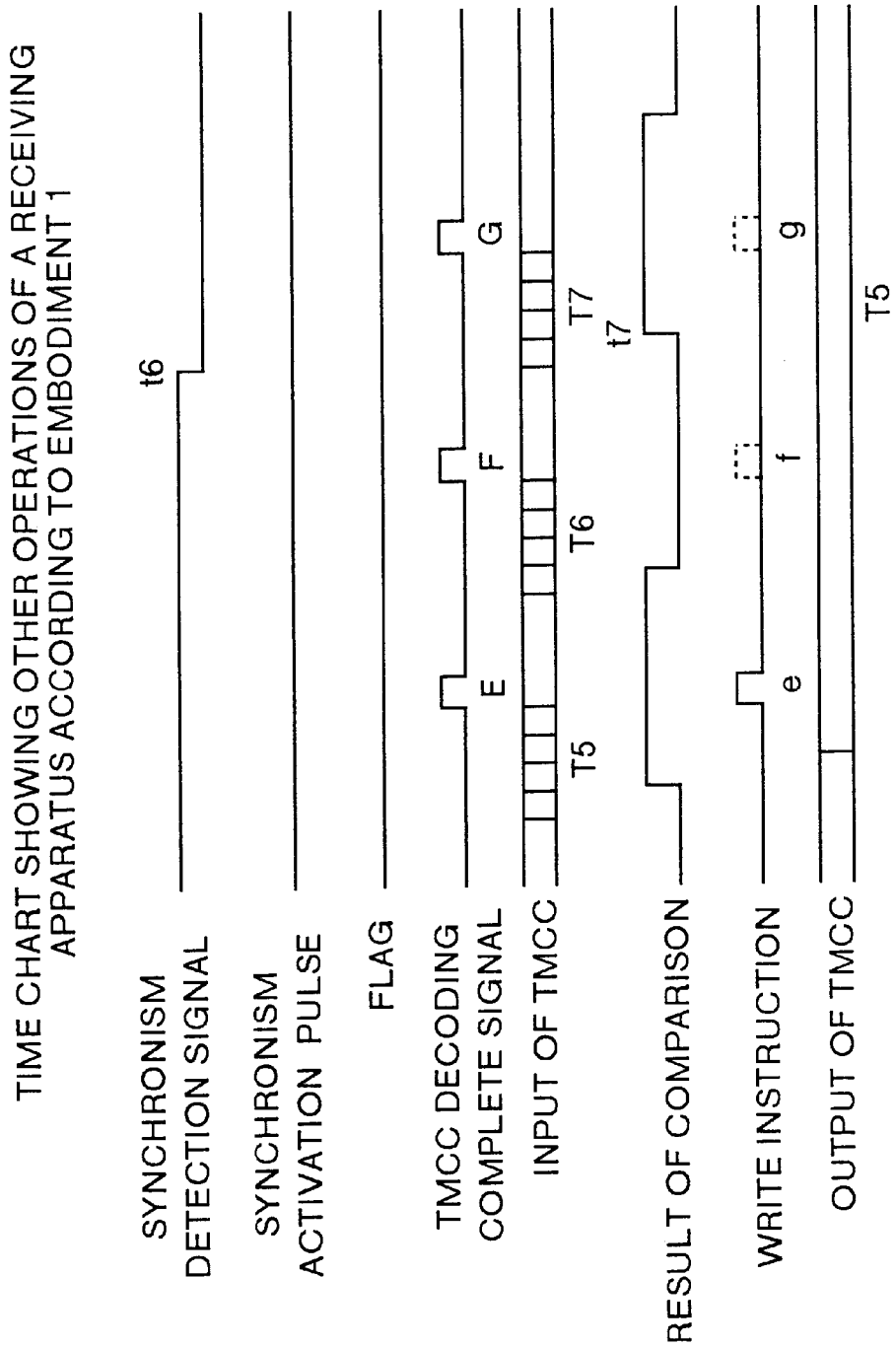
FIG. 11 is a time chart showing another operation of the receiving apparatus according to Embodiment 1.

FIG. 11 is a time chart showing another operations of the receiving apparatus according to Embodiment 1. In FIG. 11, when a synchronism detection signal shifts from "H" level to "L" level before synchronism is established by the phase demodulating apparatus 130 or synchronism detecting circuit 132 shown in FIG. 5, output from the AND gate 28 indicates the "L" level (t6).

With this configuration, even when a result of comparison shifts from "L" level to "H" level (t7) and pulse "G" in a TMCC decoding complete signal indicating completion of decoding is outputted, a pulse as a write instruction signal to the register 15 is not outputted (corresponding to the position "g" shown by a dotted line in a write instruction, and indicating that a write instruction pulse is not generated), and a TMCC signal is not written in the register 15.

The pulse "E" in the TMCC decoding complete signal indicating completion of decoding and the pulse "e" in a write instruction are the same as the pulse "C" in the TMCC decoding complete signal and the write instruction pulse "c", and the pulse "F" in the TMCC decoding complete signal and the dotted line section "f" in the write instruction are the same as "B" or "D" and "b" or "d" respectively, so that description thereof is omitted herein.

As described above, even in a case where synchronism of a digital signal is not established and a TMCC decoding complete signal indicating completion of decoding is accidentally outputted as "pulse" G, the updating instruction information stored in the updating instruction information retaining area 12 indicates a numerical value not coincident to a numerical value stored in the updating instruction information storing area 16 hence a pulse as a write instruction signal is not outputted, so that it is possible to prevent a TMCC signal from being wrongly updated.

As described above, with the receiving apparatus and receiving method according to Embodiment 1 of the present invention, a synchronous state of a digital signal, especially an activation state of a synchronism signal indicating a synchronism is detected and a write instruction for a TMCC signal is issued without fail irrespective of the contents of updating instruction information, so that obtaining of a TMCC signal upon power turn-ON or re-establishment of synchronism is insured, and in the state where synchronism has been established, a TMCC signal used for encoding a data stream is updated only when newly received updating instruction information is different from updating instruction information already stored. Therefore, updating of a TMCC signal in a digital signal, which is changed from time to time, can accurately and efficiently be updated.

Further, determination as to whether a TMCC signal has been updated or not can be made with small-scale circuit configuration comprising the activation detecting circuit 20, RS-FF 22, a logic circuit and the comparing circuit 18 and a substantial increase in power consumption can be suppressed.

Next, description is made for a receiving apparatus and a receiving method according to Embodiment 2 of the present invention. The receiving apparatus and receiving method according to Embodiment 2 are different from the receiving apparatus and receiving method according to Embodiment 1 in the point that there is provided a selecting circuit for selecting a synchronism detection signal to be inputted into the TMCC obtaining circuit according to Embodiment 1.

Figure 12:
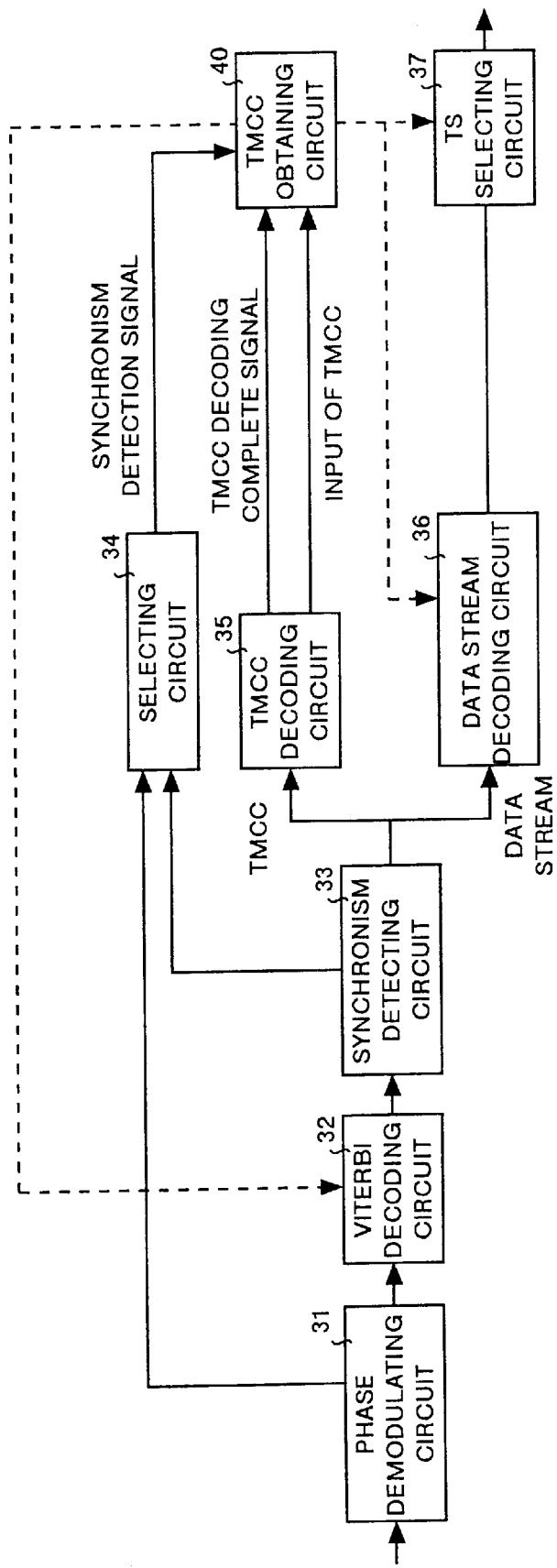
FIG. 12 is a block diagram showing general configuration of the receiving apparatus according to Embodiment 2 of the present invention.

FIG. 12 is a block showing general configuration of the receiving apparatus according to Embodiment 2. In FIG. 12, the receiving apparatus comprises a phase demodulating circuit 31, a Viterbi decoding circuit 32, a synchronism detecting circuit 33, a selecting circuit 34, a TMCC decoding circuit 35, a data stream decoding circuit 36, a TS selecting circuit 37 and a TMCC obtaining circuit 40.

The phase demodulating circuit 31 is a circuit for receiving a digital signal digitally phase-modulated in a transmitting apparatus and digitally phase-demodulating the digital signal like in the phase demodulating apparatus 130, and regenerates a carrier wave used for modulation and a clock of digital data, and detects a digital signal used for modulation of a phase of the carrier wave. The phase demodulating circuit 31 outputs a phase-demodulation synchronism signal shifting, for instance, to "H" level when phase synchronism of a received digital signal has been established, namely in the state where a carrier wave and a clock have been regenerated. This phase demodulation synchronism signal is inputted into the selecting circuit 34.

The signal demodulated in the phase demodulating circuit 31 is inputted into the Viterbi decoding circuit 32. The Viterbi decoding circuit 32 is a circuit for decoding a signal encoded by adding a redundancy signal thereto in the transmitting apparatus, and especially for decoding convolutional code.

The signal decoded in the Viterbi decoding circuit 32 is inputted into the synchronism detecting circuit 33. The synchronism detecting circuit 33 is a circuit for identifying a TMCC signal and a data stream from the signal decoded in the Viterbi decoding circuit 32, and identifies a position of a TMCC signal or other information by detecting a synchronous word inserted at a border between frames. The synchronism detecting circuit 33 outputs a frame synchronism signal shifting for instance to "H" level when a frame synchronism of an inputted signal has been established, namely when the position described above has been identified. This frame synchronism signal is also inputted into the selecting circuit 34.

The TMCC signal identified and extracted in the synchronism detecting circuit 33 is inputted into and decoded by the TMCC decoding circuit 35 before the data stream is completely decoded. The TMCC decoding circuit 35 is a circuit for decoding a TMCC signal comprising the energy dispersal signal removing circuit 133 and outer coding error correcting circuit 134 shown in FIG. 5, and description thereof is omitted herein. The TMCC decoding circuit 35 outputs a decoded TMCC signal, and also outputs a TMCC decoding complete signal indicating, for instance, "H" level when decoding of a TMCC signal is complete.

The TMCC signal and TMCC decoding complete signal are both inputted into the TMCC obtaining circuit 40 according to Embodiment 1. The selecting circuit 34 is a circuit for selecting either one of the phase demodulation synchronism signal and a frame synchronism signal and outputting the selected signal as a synchronism detection signal. The TMCC obtaining circuit 40 receives a synchronism detection signal from this selecting circuit 34. Operation of the TMCC obtaining circuit 40 is the same as described in Embodiment 1. It should be noted that, the updating instruction information is included in this TMCC signal.

Then the data stream identified in the synchronism detecting circuit 33 is inputted into the data stream decoding circuit 36, and is decoded according to the TMCC signal obtained in the TMCC obtaining circuit 40. The data stream decoding circuit 36 is a circuit for decoding a data stream comprising the deinterleaver 136, energy dispersal signal removing circuit 137 and outer coding error correcting circuit 138 shown in FIG. 5, and description thereof is omitted herein.

The data stream decoded in the data stream decoding circuit 36 is inputted into the TS selecting circuit 37. The TS selecting circuit 37 is a circuit for extracting each discrete data stream from a multiplexed data stream, like in the TS selecting circuit 139, according to the TMCC signal stored in the TMCC obtaining circuit 40, and also for selecting a desired data stream, namely either one of input signals TS inputted from a transmitting apparatus in the receiving apparatus according to Embodiment 2. The TS signal selected and outputted from the TS selecting circuit 37 is inputted into a MPEG decoding circuit (not shown) in the downstream therefrom, and enables display of a motion picture on a display unit.

As a method of realizing the receiving apparatus according to Embodiment 2, each of the phase demodulating circuit 31 or other circuits may comprises a discrete LSI or all of the circuits may be integrated in a single LSI.

Figure 13:
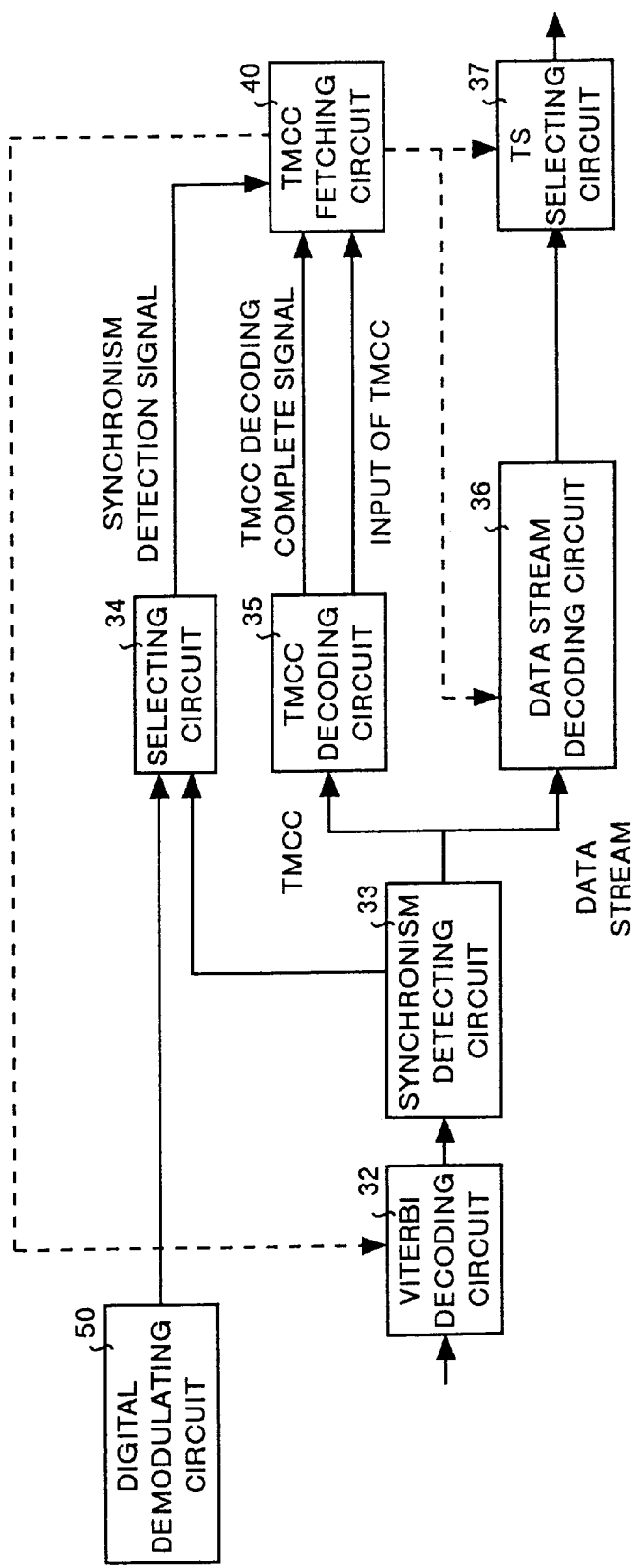
FIG. 13 is a block diagram showing another general configuration of the receiving apparatus according to Embodiment 2.

FIG. 13 is a block diagram showing another general configuration of the receiving apparatus according to Embodiment 2. In FIG. 12, the phase demodulation synchronism signal outputted from the phase demodulating circuit 31 and the frame synchronism signal outputted from the synchronism detecting circuit 33 can be inputted into and selected by the selecting circuit 34, but the receiving apparatus shown in FIG. 13 is different in the point that a demodulated state signal outputted from a digital demodulating circuit 50, namely a demodulated state signal indicating that a digital signal has been demodulated is inputted as a synchronism signal into the selecting circuit 34.

Other configuration is the same as that of the receiving apparatus shown in FIG. 12, and description thereof is omitted herein. The digital demodulating circuit 50 herein includes all digital demodulating circuits for executing demodulation of a modulated digital signal such as amplitude demodulation or frequency demodulation according to a digital modulation system for a transferred digital signal and outputting a demodulated state signal after completion of demodulation, and any one satisfying the above-described conditions may be selected according to a demodulation system executed in a given receiving apparatus or a receiving apparatus. In other words, the digital demodulating circuit 50 is a demodulating circuit for executing digital demodulation other than phase demodulation executed by the phase demodulating circuit 31.

Although a signal from an external circuit not shown is inputted into the Viterbi decoding circuit 32 in FIG. 13, like in the phase demodulating circuit 31 shown in FIG. 12, a signal demodulated by the digital demodulating circuit 50 may be inputted into the Viterbi decoding circuit 32.

Further, instead of the phase demodulating circuit 31 shown in FIG. 12 or the digitally demodulating circuit 50 shown in FIG. 13, a signal equivalent to synchronism detection outputted in the digital processing by some other circuit may be used as a synchronism detecting signal inputted into the TMCC obtaining circuit 40.

As described above, with the receiving apparatus and receiving method according to Embodiment 2, there is provided the selecting circuit 34 for selecting a synchronism detection signal to be inputted into the TMCC obtaining circuit 40 used in the receiving apparatus and receiving method according to Embodiment 1, so that various types of signal indicating detection of synchronism previously prepared in the receiving apparatus can be used, which makes it possible to more flexibly determine whether a TMCC signal has been updated or not.

The receiving apparatus according to Embodiment 1 and Embodiment 2 of the present invention can be used for various types of communication infrastructures including radio communications via a satellite, radio communications with ground waves alone, and cable communications through cable facilities.

As described above, with the present invention, there is provided a data configuration control signal updating unit for updating a data configuration control signal after a synchronism detection signal indicating detection of synchronism of a digital signal outputted from a synchronism detecting unit is received, when a decoding complete signal outputted from a decoding complete signal outputting unit is inputted first, so that, when power supply to the receiving apparatus is started and the receiving apparatus is activated or when synchronism is established again after a carrier wave is changed to another one, a data configuration control signal is updated after decoding of a data configuration control signal is complete first, and because of this configuration there is provided the advantage that it is possible to provide a receiving apparatus which can quickly obtain a data configuration control signal with a small-scale circuit configuration.

According to one feature of the present invention, there are provided a pulse outputting unit and a synchronous state maintaining unit and in the state where a synchronism detection signal is inputted and the synchronous state is maintained and at the same time when a decoding complete signal is inputted then the data configuration control signal is updated, so that, for instance, when power supply to the receiving apparatus is started and the receiving apparatus is activated or when synchronism is established again after a carrier wave is changed to another one, a data configuration control signal is updated after decoding of the data configuration control signal is compete first, hence, there is provided the advantage that it is possible to provide a receiving apparatus which can quickly obtain a data configuration control signal with a small-scale circuit configuration.

According to one feature of the present invention, there is provided a data configuration control signal updating unit for changing a data configuration control signal used for decoding a data stream to a new data control signal in the state where a synchronism detection signal indicates a synchronous state, when a comparison signal outputted after updating instruction information already stored is compared to newly received and decoded updating instruction information indicates inconsistency, and at the same time when a decoding complete signal indicates completion of decoding of a data configuration control signal. Therefore, once updating of a data configuration control signal is executed after synchronism of a digital signal is detected, the data configuration signal is updated only when newly received updating instruction information is different from updating instruction information already stored, hence, there is provided the advantage that it is possible to provide a receiving apparatus which can quickly and efficiently obtain a data configuration control signal.

According to one feature of the present invention, as a synchronism detection signal, a signal indicating the state where a data stream and a data configuration control signal are identified respectively is used, so that a circuit already provided in the receiving apparatus can be used without adding a new circuit for detecting a synchronism detection signal, which prevents the apparatus configuration from becoming more complicated, hence, there is provided the advantage that it is possible to provide a receiving apparatus which can obtain a data configuration control signal with a small-scale configuration.

According to one feature of the present invention, a signal outputted from a digitally demodulating circuit and indicating a state where a digital signal has been demodulated is used as a synchronism detection signal, so that a circuit already provided in the receiving apparatus can be used without adding a new circuit for detecting a synchronism detection signal, which prevents the apparatus configuration from becoming more complicated, hence, there is provided the advantage that it is possible to provide a receiving apparatus which can obtain a data configuration control signal with a small-scale configuration.

According to one feature of the present invention, a signal outputted from a digitally phase demodulating circuit and indicating a state where a digital signal has been phase-demodulated is used as a synchronism detection signal, so that a circuit already provided in the receiving apparatus can be used without adding a new circuit for detecting a synchronism detection signal, which prevents the apparatus configuration from becoming more complicated, hence, there is provided the advantage that it is possible to provide a receiving apparatus which can obtain a data configuration control signal with a small-scale configuration.

According to one feature of the present invention, there is provided a selecting unit for either a recognized state signal outputted from a synchronism detecting unit and a demodulated state signal outputted from a digitally demodulating unit and outputting the selected signal as a synchronism detection signal, and because of this configuration, there is provided the advantage that it is possible to provide a receiving apparatus which can select and use any of various types of signals each indicating detection of synchronism previously prepared in the receiving apparatus and can more flexibly determine whether a data configuration control signal has been updated or not.

According to one feature of the present invention, there is provided a selecting unit for selecting either a recognized state signal outputted from a synchronism detecting unit and a demodulated state signal outputted from a digital phase-demodulating unit and outputting the selected signal as a synchronism detection signal, and because of this configuration, there is provided the advantage that it is possible to provide a receiving apparatus which can select and use any of various types of signals each indicating detection of synchronism previously prepared in the receiving apparatus and can more flexibly determine whether a data configuration control signal has been updated or not.

According to one feature of the present invention, when a decoding complete signal outputted first after a synchronism detection signal indicating detection of synchronism of a digital signal is inputted the data configuration control signal is updated, so that, for instance, when power supply to the receiving apparatus is started and the receiving apparatus is activated or when synchronism is established again after a carrier wave is changed to another one, a data configuration control signal is updated after decoding of a data configuration control signal is complete first, hence, there is provided the advantage that it is possible to provide a receiving method making it possible to quickly and efficiently obtain a data configuration control signal.

According to one feature of the present invention, in the state where a synchronism detection signal indicates a synchronous state, and at the same time where updating instruction information already stored is not coincident to a newly received updating instruction information, a data configuration control signal used for decoding a data stream to a newly received configuration control signal when a decoding complete signal indicates completion of decoding of a data configuration control signal, so that, after synchronism of a digital signal is detected and updating of a data configuration control signal is updated once, the data configuration control signal is updated only when the newly received updating instruction information is different from updating instruction information already stored, so that there is provided the advantage that it is possible to provide a receiving method making it possible to efficiently and quickly obtain a data configuration control signal.

This application is based on Japanese patent application No. HEI 10-332203 filed in the Japanese Patent Office on Nov. 11, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A receiving apparatus comprising:
   a receiver for receiving a digital signal with a plurality of data streams each based on a different transfer system, data configuration control signal indicating a transfer system, configuration and location of each of the data streams, and updating instruction information for instructing updating of the data configuration control signal multiplexed therein;
   a decoder for decoding the data streams using the updated data configuration control signal;
   a synchronism detecting unit for detecting synchronism of the digital signal and outputting a synchronism detection signal indicating the synchronous state;
   a decoding complete signal outputting unit for outputting a decoding complete signal indicating that decoding of the data configuration control signal is complete; and
   a data configuration control signal updating unit for updating the data configuration control signal in the state where the synchronism detection signal outputted from said synchronism detecting unit has been inputted, when a decoding complete signal outputted from said decoding signal outputting unit is inputted first after the synchronism detection signal is inputted.

2. A receiving apparatus according to claim 1, wherein said data configuration control signal updating unit comprises:
- a pulse outputting unit for outputting a synchronism detection pulse when a synchronism detection signal outputted from said synchronism detecting unit is received; and
- a synchronous state maintaining unit for maintaining the synchronous state when the synchronism detection pulse outputted from said pulse outputting unit is inputted and releasing the synchronous state when the decoding complete signal outputted from said decoding complete signal outputting unit is inputted;
- wherein the synchronous state is maintained by the synchronous state maintaining unit in the state where the synchronism detection signal outputted from said synchronism detecting unit has been inputted, and the data configuration control signal is updated when the decoding complete signal outputted from said decoding compete signal outputting unit is inputted.

3. A receiving apparatus according to claim 1, wherein said synchronism detecting unit outputs, as the synchronism detection signal, a recognized state signal indicating a state where the data stream and the data configuration control signal have been recognized respectively.

4. A receiving apparatus according to claim 1, wherein said synchronism detecting unit outputs, as the synchronism detection signal, a decoded state signal indicating a state where the digitally modulated digital signal has been decoded.

5. A receiving apparatus according to claim 1, wherein said synchronism detecting unit outputs, as the synchronism detection signal, a phase-demodulated state signal indicating a state where the digitally phase-modulated digital signal has been phase-demodulated.

6. A receiving apparatus according to claim 1, wherein said synchronism detecting unit further comprises:
- a selecting unit capable of selecting either a recognized state signal indicating a state where the data streams and the data configuration control signal have been recognized or a demodulated state signal indicating a state where the digitally modulated digital signal has been demodulated and outputting a selected signal as the synchronism detection signal.

7. A receiving apparatus according to claim 1, wherein said synchronism detecting unit further comprises:
- a selecting unit capable of selecting either a recognized state signal indicating a state where the data streams and the data configuration control signal have been recognized respectively or a phase-demodulated state signal indicating a state where the digitally phase-modulated digital signal has been phase-demodulated and outputting a selected signal as the synchronism detection signal.

8. A receiving apparatus comprising:
- a receiver for receiving a digital signal with a plurality of data streams each based on a different transfer system, data configuration control signal indicating a transfer system, configuration and location of each of the data streams, and updating instruction information for instructing updating of the data configuration control signal multiplexed therein;
- a decoder for decoding the data streams using the updated data configuration control signal;
- a synchronism detecting unit for detecting synchronism of the digital signal and outputting a synchronism detection signal indicating the synchronous state;
- a decoding complete signal outputting unit for decoding the data configuration control signal and outputting a decoding complete signal;
- a updating instruction information storing unit for storing therein the updating instruction information;
- a inconsistency detecting unit for detecting inconsistency between the updating instruction information stored in said updating instruction information storing unit and an updating instruction information newly received and outputting an inconsistency detection signal indicating an inconsistency; and
- a data configuration control signal updating unit for updating the data configuration control signal in the state where the synchronism detection signal outputted from said synchronism detecting unit has been inputted, when the inconsistency detection signal outputted from said inconsistency detecting unit is inputted, and at the same time when the decoding complete signal outputted from said decoding complete signal outputting unit is inputted.

9. A receiving apparatus according to claim 8, wherein said synchronism detecting unit outputs, as the synchronism detection signal, a recognized state signal indicating a state where the data stream and the data configuration control signal have been recognized respectively.

10. A receiving apparatus according to claim 8, wherein said synchronism detecting unit outputs, as the synchronism detection signal, a decoded state signal indicating a state where the digitally modulated digital signal has been decoded.

11. A receiving apparatus according to claim 8, wherein said synchronism detecting unit outputs, as the synchronism detection signal, a phase-demodulated state signal indicating a state where the digitally phase-modulated digital signal has been phase-demodulated.

12. A receiving apparatus according to claim 8, wherein said synchronism detecting unit further comprises:
- a selecting unit capable of selecting either a recognized state signal indicating a state where the data streams and the data configuration control signal have been recognized or a demodulated state signal indicating a state where the digitally modulated digital signal has been demodulated and outputting a selected signal as the synchronism detection signal.

13. A receiving apparatus according to claim 8, wherein said synchronism detecting unit further comprises:
- a selecting unit capable of selecting either a recognized state signal indicating a state where the data streams and the data configuration control signal have been recognized respectively or a phase-demodulated state signal indicating a state where the digitally phase-modulated digital signal has been phase-demodulated and outputting a selected signal as the synchronism detection signal.

14. A receiving method comprising:
- a step of receiving a digital signal with a plurality of data streams each based on a different transfer system, data configuration control signal indicating a transfer system, configuration and location of each of the data streams, and updating instruction information for instructing updating of the data configuration control signal multiplexed therein;
- a step of decoding the data streams using the updated data configuration control signal;
- a step of updating the data configuration control signal when decoding of the data configuration control signal is complete first after synchronism of the digital signal is detected.

15. A receiving method comprising:

a step of receiving a digital signal with a plurality of data streams each based on a different transfer system, data configuration control signal indicating a transfer system, configuration and location of each of the data streams, and updating instruction information for instructing updating of the data configuration control signal multiplexed therein;

a step of decoding the data streams using the updated data configuration control signal;

a step of storing the updating instruction information; and a step of updating the data configuration control signal in a state where synchronism of the digital signal has been detected and at the same time inconsistency between the stored updating instruction information and updating instruction information newly received has been detected, when decoding of the data configuration control signal is complete.

* * * * *